US008136729B2

(12) United States Patent
Bolton

(10) Patent No.: US 8,136,729 B2
(45) Date of Patent: Mar. 20, 2012

(54) BALLOT TABULATION DEVICE AND METHOD FOR TABULATING PAPER BALLOTS PRINTED ACCORDING TO BALLOT STYLE

(75) Inventor: Steve Bolton, Clearwater, FL (US)

(73) Assignee: ES&S Innovations, LLC, Omaha, NE (US)

( * ) Notice: Subject to any disclaimer, the term of this patent is extended or adjusted under 35 U.S.C. 154(b) by 499 days.

(21) Appl. No.: 12/403,995

(22) Filed: Mar. 13, 2009

(65) Prior Publication Data

US 2010/0230491 A1 Sep. 16, 2010

(51) Int. Cl.
*G06K 17/00* (2006.01)
*G07C 13/00* (2006.01)

(52) U.S. Cl. ....... 235/386; 235/51; 235/50 B; 235/54 A; 705/12

(58) Field of Classification Search .................. 235/386, 235/51, 54 F, 50 A, 50 B, 454; 705/12; 283/5, 283/67, 72
See application file for complete search history.

(56) References Cited

U.S. PATENT DOCUMENTS 6,854,644 B1 2/2005 Bolton et al.
6,892,944 B2 5/2005 Chung et al.
7,077,313 B2 7/2006 Chung et al.
2002/0077887 A1* 6/2002 London Shrader et al. .... 705/12
2003/0173404 A1* 9/2003 Chung et al. .................. 235/386
2006/0202031 A1 9/2006 Chung et al.
2008/0308633 A1 12/2008 Bolton et al.
2008/0308634 A1 12/2008 Bolton et al.

OTHER PUBLICATIONS

"The iVotronic Voting System Operations Manual", Election Systems and Software, Inc., 109 pgs., Jan. 2001.
Election Systems and Software, brochure, *Model 100 Precinct Ballot Counter*, Mar. 22, 2005, 1 pg.
Election Systems and Software, brochure, *intElect DS200, The Next Generation of Paper-Based Vote Tabulation*, 2 pgs (This brochure describes a product in use prior to the filed of this application.).

* cited by examiner

*Primary Examiner* — Edwyn Labaze
(74) *Attorney, Agent, or Firm* — Stinson Morrison Hecker LLP

(57) ABSTRACT

A ballot tabulation device and method for tabulating paper ballots that have been printed according to ballot style. In an exemplary embodiment, the ballot tabulation device includes an input device, such as a touch screen display, that enables a user to enter a precinct identification code for a paper ballot. The device also includes a scanner operable to scan the paper ballot, and a processing circuit operable to decode one or more voting selections marked on the paper ballot. The processing circuit is further operable to tabulate the decoded voting selections and include the tabulated voting selections within the vote tally associated with the precinct identification code. Other exemplary embodiments are also disclosed.

57 Claims, 17 Drawing Sheets

BALLOT TABULATION DEVICE AND METHOD FOR TABULATING PAPER BALLOTS PRINTED ACCORDING TO BALLOT STYLE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to voting systems and, more particularly, to a ballot tabulation device and method for tabulating paper ballots printed according to ballot style.

2. Description of Related Art

A variety of different types of voting equipment are used in the United States and throughout the world. In many jurisdictions, a voter receives a paper ballot on which is printed the various contests to be voted on. The voter votes by darkening or otherwise marking the appropriate mark spaces on the paper ballot. The marked paper ballot may then be dropped in a ballot box, whereby the ballot is transferred to a centralized location (e.g., a county courthouse) for tabulation by a high-speed tabulation device. Alternatively, many jurisdictions provide a smaller precinct-based ballot tabulation device at each polling place that allows a voter to directly insert her ballot into the device for tabulation. At the end of the election day, the vote totals from each of the precinct-based ballot tabulation devices are accumulated at the centralized location (e.g., the county courthouse), which is required to report the election results by voting precinct in accordance with state election laws.

In order to prepare for an election, a jurisdiction must print the paper ballots for each of the voting precincts within the jurisdiction, wherein each ballot includes a code that allows a precinct-based ballot tabulation device to determine the ballot style and precinct for the ballot. The jurisdiction must also program each of its precinct-based ballot tabulation devices with an election definition that allows the device to read the paper ballots applicable to that voting precinct (i.e., the election definition will vary from precinct to precinct). In some jurisdictions, the county will maintain a staff of employees who are trained to set-up the election information for each of the voting precincts within the jurisdiction. In other jurisdictions, there is little money to maintain such a staff and the county will instead rely on a vendor to supply the equipment and software necessary to accomplish this task.

The software package that is used to set-up the election information is commonly referred to as an election management system (EMS). The EMS performs the necessary steps of creating an election database that includes all of the district, contest, candidate and precinct information for the jurisdiction. This information is then used to create various ballot styles for each of the voting precincts within the jurisdiction. In other words, the EMS will create a different ballot style for each ballot face of each voting precinct within the jurisdiction.

Large jurisdictions have found the exercise of setting-up the election information to be very overwhelming. Managing thousands of different ballot styles across a multitude of voting precincts is a very arduous task. As a simplified example, if there is a single contest in an election for a jurisdiction with 1000 voting precincts, the jurisdiction must print different paper ballots for each of the 1000 voting precincts because of the differences between the codes on the ballots. Thus, although the paper ballots for each of the 1000 voting precincts may appear to be identical (i.e., they each include the same contest), the ballots are in fact different due to the different codes printed on the ballots.

BRIEF SUMMARY OF THE INVENTION

The present invention is directed to a ballot tabulation device and method that allows a jurisdiction to eliminate the task of producing precinct-based paper ballots, and simply print paper ballots by "ballot style" that may be used across different voting precincts. The invention also allows a Jurisdiction to program all of its precinct-based ballot tabulation devices with the same election definition, thereby eliminating the task of ensuring that each device has the correct memory device loaded onto it for the specific voting precinct.

In accordance with an exemplary embodiment of the invention, a voter checks in with a polling official and receive a paper ballot with the appropriate ballot style. The ballot includes one or more contests and associated mark spaces, but does not include any precinct identification information. The voter also receives a slip of paper that contains a precinct identification code. The precinct identification code may comprise a string of characters associated with the voting precinct for the voter. The voter then marks her voting selections on the paper ballot and proceeds to the ballot tabulation device.

The ballot tabulation device includes an input device operable to receive the precinct identification code for the paper ballot. In a preferred embodiment, the input device comprises a touch screen display operable to display an entry screen, such as a soft keypad, that enables entry of the precinct identification code. The input device could also comprise a physical keypad for entry of the precinct identification code. In either case, the precinct identification code may be entered by either a polling official or the voter herself. Alternatively, the precinct identification code may be provided on a paper medium, such as a label attached to the paper ballot, and may further be encoded in a barcode printed on the paper medium. In this case, the input device may comprise a reader operable to read the precinct identification code (or the barcode) on the paper medium.

The ballot tabulation device also includes a scanner operable to scan the paper ballot, and a processing circuit operable to utilize the election definition to decode one or more voting selections marked on the paper ballot. Preferably, any irregularities associated with the paper ballot (e.g., an undervote and/or an overvote) are identified and displayed to the voter on a touch screen display so that the voter may correct the irregularities if desired. The processing circuit is further operable to tabulate the decoded voting selections and include the tabulated voting selections within the vote tally associated with the precinct identification code. Preferably, the vote tally comprises a vote total for each of the voting options on the ballot. A memory device is also provided for storing the vote tally for each of the precinct identification codes.

DETAILED DESCRIPTION OF EXEMPLARY EMBODIMENT

The present invention is directed to a ballot tabulation device and method for tabulating paper ballots that have been printed according to ballot style. While the invention will be described in detail below with reference to an exemplary embodiment, it should be understood that the invention is not limited to the specific configuration or methodology of this embodiment. In addition, although the exemplary embodiment is described as embodying several different inventive features, one skilled in the art will appreciate that any one of these features could be implemented without the others in accordance with the invention.

Exemplary Configuration of Ballot Tabulation Device

Figure 1:
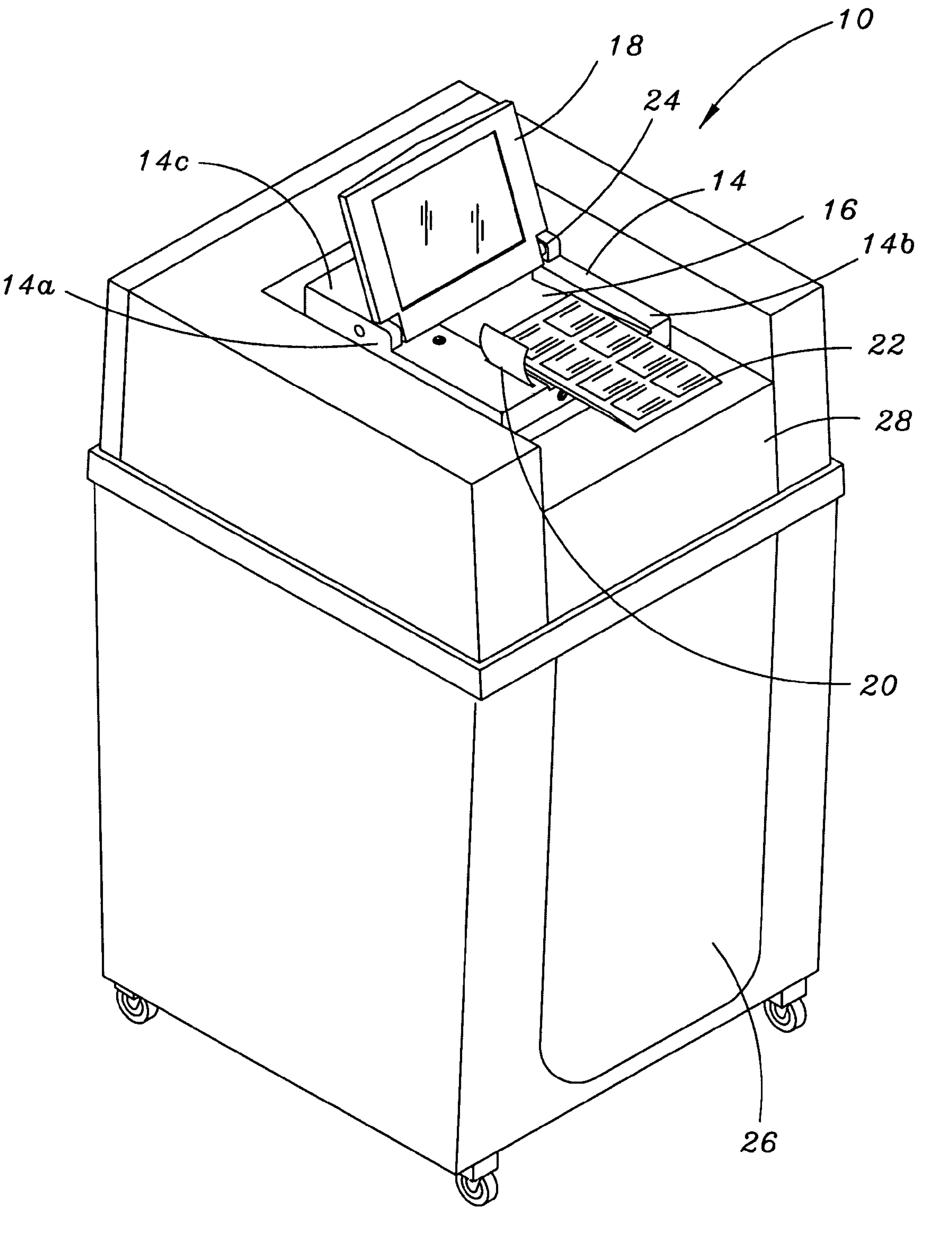
FIG. 1 is a perspective view of an exemplary embodiment of a ballot tabulation device in accordance with the present invention.

Referring to FIG. 1, an exemplary embodiment of a ballot tabulation device in accordance with the present invention is shown as reference numeral 10. Ballot tabulation device 10 generally includes a protective housing 14 with various internal components (as described in detail with reference to FIG. 2), a ballot insertion tray 16, a display 18 and a report printer 20. Each of these components will be described in detail below.

Protective housing 14 is preferably made of injection-molded plastic and has a modular "clamshell" design that provides easy access for maintenance and set up activities. Of course, other materials and designs are also within the scope of the present invention. Protective housing 14 preferably comprises three primary sections to assist in ease of manufacturing and maintenance: base section 14*a*, front cover section 14*b*, and rear cover section 14*c*. In addition, various access doors (not shown) may be included to provide access to a variety of switches, connections and interfaces. For example, in the exemplary embodiment, a locked access door is provided to secure access to a power switch, a "close polls" switch, and a modem with an RJ-11 connection and antenna (discussed further in connection with the main access board 66 of FIG. 2). Another locked access door is provided to secure access to various USB port interfaces for removable USB flash drives (discussed further in connection with the USB board 64 of FIG. 2).

The back of protective housing 14 preferably includes a variety of external ports (not shown), such as a USB hub 70 (FIG. 2) and other types of ports that are standard and well known in the art. The back of protective housing 14 also preferably includes a personalized electronic ballot (PEB) reader/writer (discussed further in connection with the PEB board 68 of FIG. 2). Of course, the external ports and PEB reader/writer may be located in other locations provided they do not interfere with the use of the ballot tabulation device 10.

The ballot insertion tray 16 is provided to receive a paper ballot for scanning and tabulation. The ballot insertion tray 16 is preferably molded into the front cover section 14*b* of protective housing 14 and is approximately 8.525 inches wide in order to accommodate an 8.5 inch wide standard-size ballot, such as ballot 22 shown in FIG. 1. The ballot insertion tray 16 can, however, be designed to fit any size ballot. An additional tray insert (not shown) having reversible paper guides may be mounted into the ballot insertion tray 16. For example, when the paper guides are oriented down, the ballot insertion tray 16 may accommodate an 8.5 inch wide ballot. When the paper guides are oriented up, a 4.25 inch wide ballot may be supported. An arrow graphic is also preferably molded onto the ballot insertion tray 16 or additional tray insert to indicate the proper insertion of the ballot. Lastly, the ballot insertion tray 16 preferably has a ribbed texture to assist with reducing static buildup.

The display 18 is preferably an LCD touch screen display with a landscape orientation. The display 18 may be a standard, off-the-shelf component which is readily available and well known in the art. For example, the display 18 may be a standard size of 10.4 inches or 12.1 inches, measured diagonally, and approximately 82×82 dpi. Most preferably, the display 18 is an LG Philips 12.1" SVGA (800×600) TFT color display model LB121S03-TL01, which has a color depth of LVDS 6-bit, 262,144 colors and an anti-glare surface treatment. Of course, other types of touch screen displays may also be utilized in accordance with the present invention.

The display 18 is connected to the upper portion of ballot tabulation device 10 by two hinges 24—one located on each side of the display 18—which enable the display 18 to open up during use or fold down flat during storage. For security and protection, the display 18 preferably incorporates a locking mechanism. The ballot tabulation device 10 may include an LCD switch 72 (FIG. 2) that will sense that the display 18 is open to thereby power up without necessitating a polling official physically turning on the display 18. Similarly, the LCD switch 72 will sense that the display 18 is closed to thereby power down after a specified period of time.

Alternatively, if the display 18 is not configured as a touch screen display, the ballot tabulation device 10 would also include another type of input device, such as a keypad, a joystick, a pointing device, a trackball or a touch pad. The display 18 may also comprise a cathode ray tube (CRT) display configured as a touch screen display located external to the ballot tabulation device 10. In such a configuration, the display would be connected to the ballot tabulation device 10 through a dedicated I/O connector of the ballot tabulation device 10. Of course, other types of displays and input devices are also possible and within the scope of the present invention.

As will be described in greater detail below, the display 18 provides a voter interface that may be used to enter a precinct identification code for the paper ballot 22. The display 18 may also be used to display information associated with a scanned paper ballot to the voter (e.g., information on ballot irregularities) and receive voter feedback.

The report printer 20 is an internal printer for device level and polling place level reporting, including the printing of reports at poll opening and poll closing (as are known in the art). The report printer 20 is a standard printer that is readily available and well known to those skilled in the art. The report printer 20 is capable of printing on paper that is approximately 3 inches wide and is of the drop-in roll paper type. As shown in FIG. 1, the paper passes through an aperture in the protective housing 14 such that it is easily accessible by users.

As shown in FIG. 1, ballot tabulation device 10 mounts onto the top of a ballot receptacle 26. The base of ballot tabulation device 10 includes four mounting feet (not shown) that provide airflow under the unit and allow it to be securely inserted into a recessed area of the ballot receptacle 26. In this embodiment, ballot tabulation device 10 slides onto mounting rails (not shown) located on top of the ballot receptacle 26. A hinged door (not shown) may be located on the front of the ballot receptacle 26 and may be raised up and locked into place to further secure the ballot tabulation device 10. The ballot receptacle 26 is preferably made of steel or a durable plastic material for security purposes. In operation, scanned and tabulated ballots are deposited directly into the ballot receptacle 26. In addition, the ballot receptacle 26 preferably includes a compartment 28 that polling officials can use to temporarily store uncounted ballots in the event of a power failure, scanner error, or the like. Of course, the ballot receptacle 26 may have other configurations as are well known to those skilled in the art.

Figure 2A:
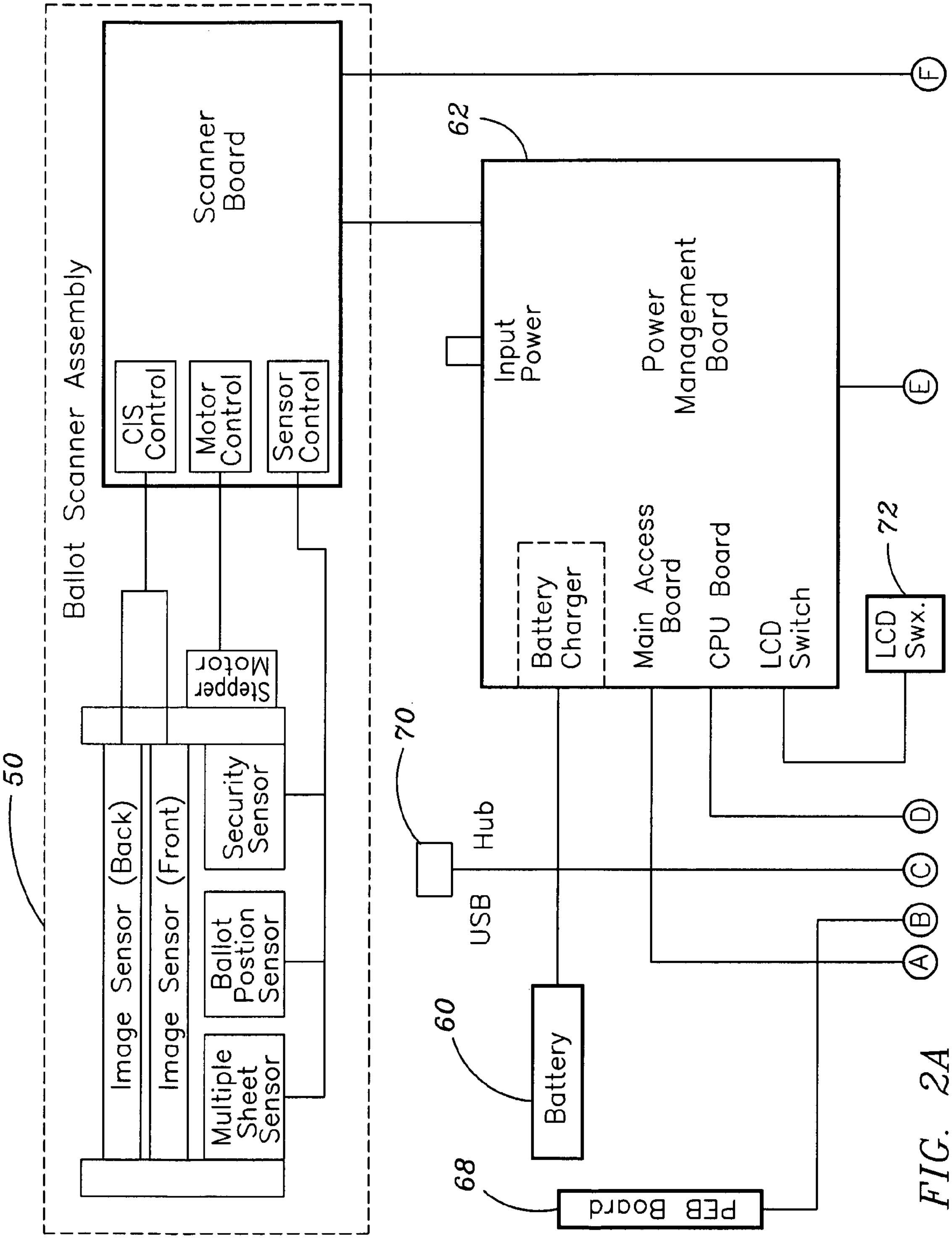
FIG. 2 is a block diagram of the various internal components of the ballot tabulation device of FIG. 1.
Figure 2B:
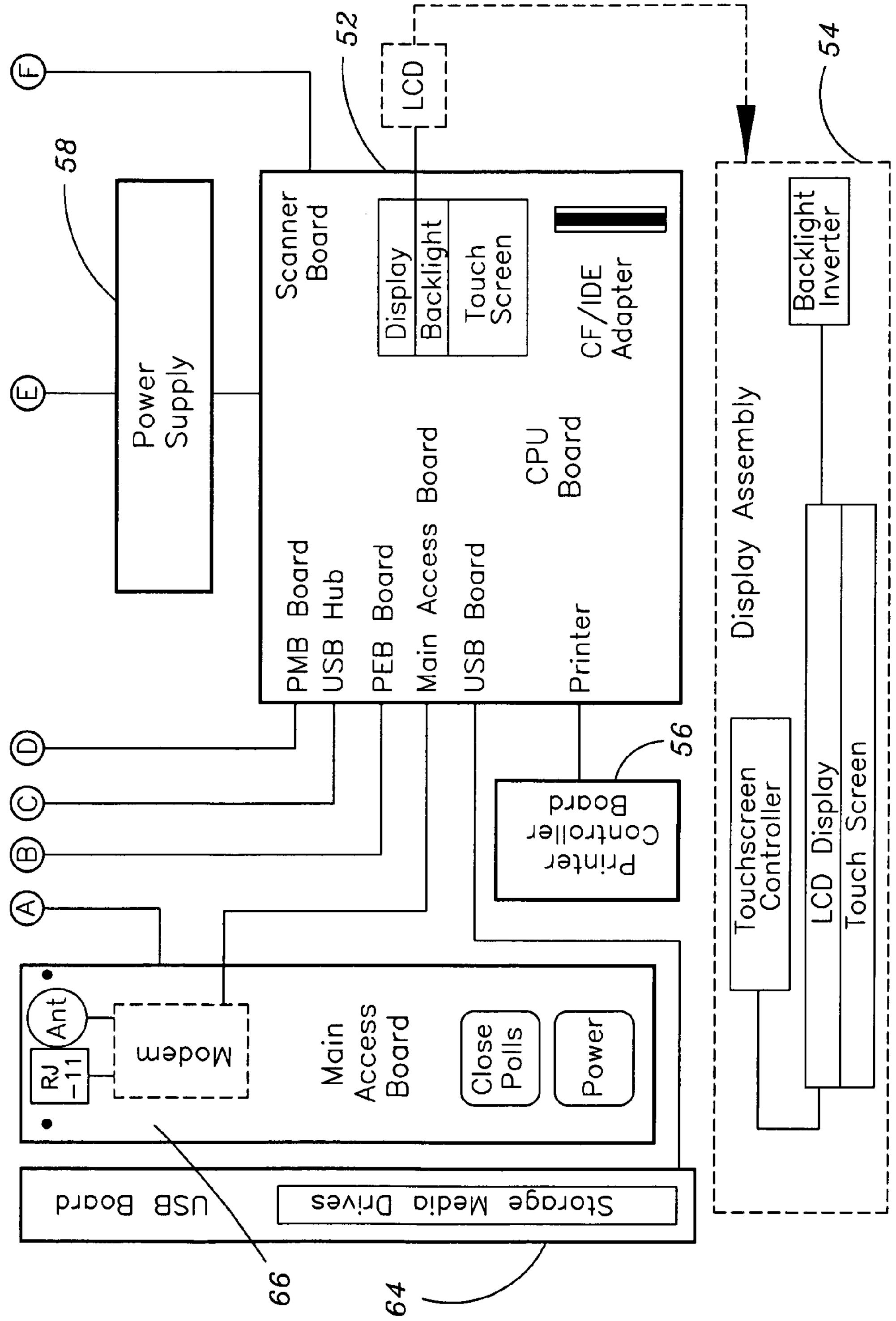

Turning to FIG. 2, the internal components of ballot tabulation device 10 are shown in a block diagram format and generally include: a ballot scanner assembly 50, a CPU board 52, a display assembly 54, a printer controller board 56, an internal power supply 58, an internal battery pack 60, a power management board 62, a USB board 64, a main access board 66, a PEB board 68, a USB hub 70, and an LCD switch 72 (discussed above). It should be understood that the various components and subsystems are connected to each other as shown in FIG. 2.

The ballot scanner assembly 50 includes a scanner board that provides the image capture, processing and transport control functions associated with scanning a paper ballot. The ballot scanner assembly 50 utilizes a set of sensors to monitor each paper ballot as it is placed in the ballot insertion tray 16 of ballot tabulation device 10 and travels through the ballot transport mechanism (not shown). These sensors detect the position of the ballot, check for multiple ballots and confirm the release of the ballot into the ballot receptacle 26. There may also be a security sensor that detects counterfeit ballots and ballots that have been tampered with. The ballot scanner assembly 50 utilizes two contact image sensors to produce a bitmap image of the paper ballot (preferably at 200 dpi or greater). One contact image sensor is positioned to read the top surface of the ballot and the other contact image sensor is positioned to read the bottom surface of the ballot. The imaging of the top and bottom surfaces of the ballot preferably occurs simultaneously. The paper ballot is pulled across the contact image sensors to capture the ballot image. In this embodiment, the ballot scanner assembly 50 utilizes image capture technology available from Ricoh Electronics, Inc. The ballot image captured by the ballot scanner assembly 50 is passed to the CPU board 52, which decodes and tabulates the voting selections marked on the scanned ballot (described further below).

The CPU board 52 is a commercial off-the-shelf board that generally controls the operation of ballot tabulation device 10. The CPU board 52 is preferably capable of executing at least two independent processes concurrently. Accordingly, it is preferable to use an operating system that includes multi-tasking functionality, such as Linux and other operating systems known in the art. In this embodiment, the CPU board 52 is a VIA Embedded Platform EPIA-CL with a VIA C3™ or VIA Eden™ ESP processor. The CPU board 52 may include any type of memory that is suitable for storing information necessary for the operation of ballot tabulation device 10, as is well known in the art.

Many of the other internal components of ballot tabulation device 10 are also well known in the art. For example, the display assembly 54 includes an LCD display touch screen, a backlight inverter and a touch screen controller that provides an interface to display 18. The printer controller board 56 provides an interface to the report printer 20. In addition, the USB hub 70 provides a plurality of external USB ports that provide a connection for a variety of external devices.

The USB board 64 includes a plurality of external USB port interfaces that accommodate removable USB flash drives or any other type of removable data storage system. The removable USB flash drives may be used to store the election definition and the accumulated vote totals for ballot tabulation device 10. Also, the removable USB flash drives may be used to store the images of the scanned ballots, which may be accessed at a later time for audit purposes.

The main access board 66 includes a power switch and a "close polls" switch. The main access board 66 also includes a modem with an RJ-11 connector and antenna, which provide both landline and wireless modem options for transmitting vote results to a central vote accumulation site. The PEB board 68 provides an interface to a PEB reader/writer for reading information from and writing information to various PEBs.

The ballot tabulation device 10 is powered by a power management subsystem that includes the power management board 62, an internal battery pack 60, and an internal ITX power supply 58. The power management board 62 is a custom power supply board which receives its input from an external brick power supply that operates on standard AC-volt lines. The internal battery pack 60 (preferably a re-chargeable Lithium-Ion type) provides up to two hours of operation during a loss of AC power. The internal ITX power supply 58 provides power to the CPU board 52, as is known in the art. The power management board 62 monitors the status of and charges the internal battery pack 60, and automatically switches from the external brick power supply to the internal battery pack 60 as needed.

Exemplary Operation of Ballot Tabulation Device

An exemplary embodiment of the operation of ballot tabulation device 10 will now be described. First, a polling official opens the poll by depressing the "power" switch located on the main access board 66 of ballot tabulation device 10 and transferring the election definition data to the ballot tabulation device 10. The transfer of the election definition data may be effectuated by a variety of different means. For example, a removable USB flash drive may be inserted into one of the USB ports of USB board 64. Alternatively, a PEB may be inserted into the PEB reader/writer of PEB board 68. Of course, other means are also within the scope of the present invention.

After transfer of the election definition data, ballot tabulation device 10 is ready to scan and tabulate paper ballots. The voting process for a single voter will be described with reference to blocks 100 to 122 of the process flow diagram shown in FIG. 3. However, it should be understood that this voting process would be repeated for each of the voters at the polling place.

Figure 3:
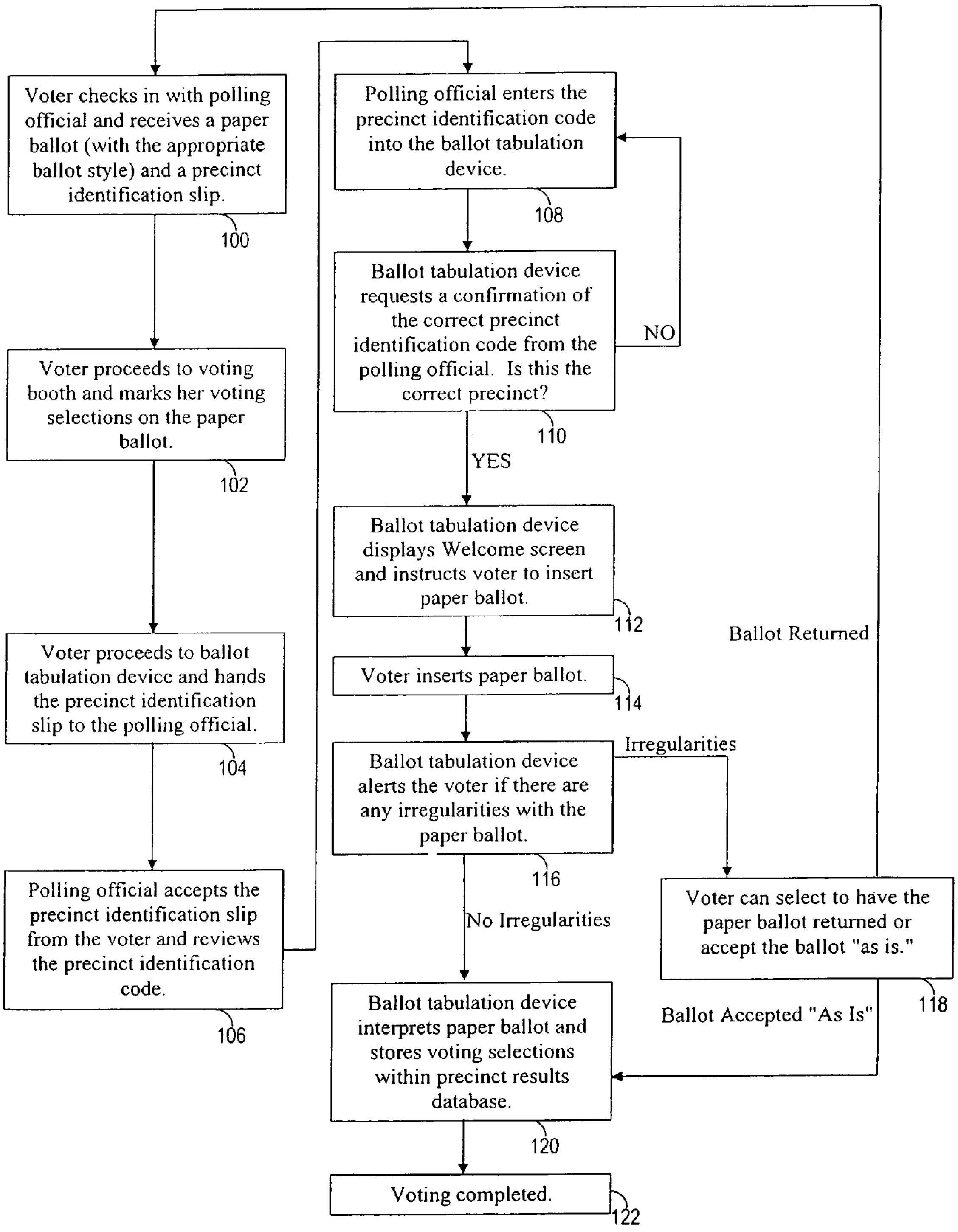
FIG. 3 is a process flow diagram of an exemplary voting process using the ballot tabulation device of FIG. 1.
Figure 4:
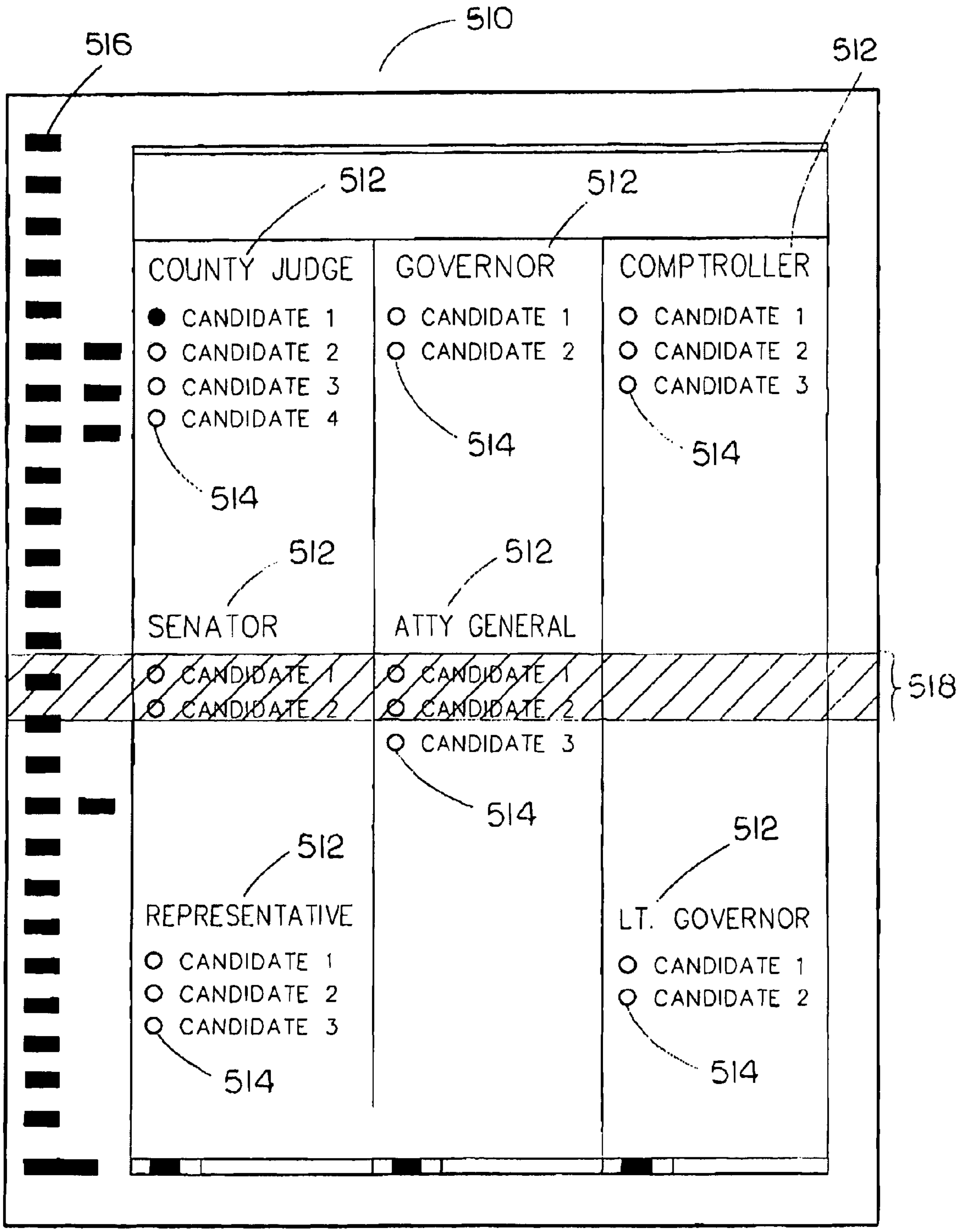
FIG. 4 is a plan view of an exemplary embodiment of a paper ballot that may be scanned and tabulated by the ballot tabulation device of FIG. 1.

Referring to FIG. 3, at block 100, a voter arrives at a polling place and checks in with a polling official. The polling official locates the voter's name in the voter registration system, and hands the voter a paper ballot having the appropriate ballot style for that particular voter. The ballot 510 shown in FIG. 4 is an example of such a paper ballot. Ballot 510 includes printed indicia 512 that includes a description of each contest (e.g., "County Judge") and the names of the candidates or voting options associated with each contest (e.g., Candidates 1-4). Ballot 510 also includes mark spaces 514 corresponding to each of the candidates or voting options in each contest. As is known in the art, the voter may darken or otherwise mark the mark space corresponding to her selection for each of the contests. Alternatively, the voter may utilize a ballot marking device to print a mark in each of the appropriate marks spaces, such as the AutoMARK® ballot marking device sold by the assignee of the present application. Ballot 510 further includes a series of rectangular timing marks 516 positioned along and down the left side and across the bottom of the ballot. The timing marks 516 permit ballot tabulation device 10 to determine the position (i.e., row and column) of each of the mark spaces 514 on the ballot. Ballot 510 further includes a plurality of rectangular code channel marks 517 positioned adjacent the timing marks 516 on the left side of the ballot. The code channel marks 517 are used to identify the ballot style of ballot 510 so that ballot tabulation device 10 is able to associate the marked voting selections with the correct candidates or voting options printed on the ballot (using the election definition data, as described further below). Ballot 510 may also include a security feature 518 that may be detected by a security sensor located within ballot tabulation device 10 in order to identify counterfeit ballots. Importantly, ballot 510 does not include any precinct identification information.

Figure 5:
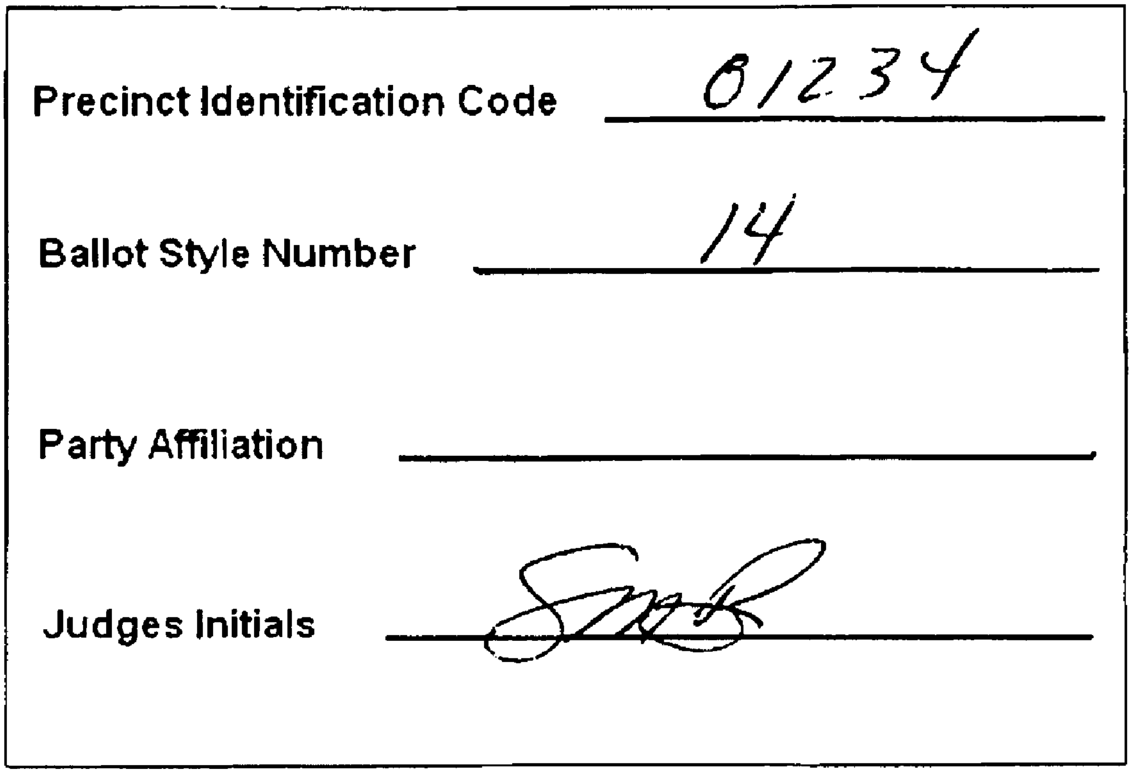
FIG. 5 is a plan view of an exemplary embodiment of a precinct identification slip.

Referring back to block 100 of FIG. 3, the polling official also hands the voter a precinct identification slip, an example of which is shown in FIG. 5. As can be seen, the slip includes the text "Precinct Identification Code" and an associated line on which the voting official may hand-write the precinct identification code (e.g., "01234"). The precinct identification code may comprise a string of numeric or alphanumeric characters associated with the voting precinct for the voter. The slip may also include the text "Ballot Style Number" and an associated line on which the voting official may hand-write the appropriate ballot style number for the voter (e.g., "14"). Of course, the ballot style number may alternatively be encoded in the code channel marks 517 of the ballot 510 (as shown in FIG. 4). If the election is a primary election, the slip may also include the text "Party Affiliation" and an associated line on which the voting official may hand-write the voter's party affiliation (this line is blank in FIG. 5). Further, the slip may include the text "Judge's Initials" and an associated line on which the voting official may sign his initials on the slip. Of course, one skilled in the art will appreciate that all of the information on the slip is optional with the exception of the precinct identification code.

Referring back to FIG. 3, at block 102, the voter proceeds to a voting booth whereby she marks her voting selections by darkening or otherwise marking the appropriate mark spaces 514 on the paper ballot 510. Then, at block 104, the voter proceeds to the ballot tabulation device 10 and hands the precinct identification slip to a polling official. At block 106, the polling official accepts the precinct identification slip from the voter and reviews the precinct identification code written thereon. At block 108, the polling official enters the precinct identification code into the ballot tabulation device 10 and, at block 110, the polling official confirms the correct precinct identification code. Alternatively, the voter herself may enter and confirm the precinct identification code. The series of entry screens displayed on display 18 of ballot tabulation device 10 in connection with steps 108 and 110 are shown in FIGS. 6A-6E.

Figure 6A:
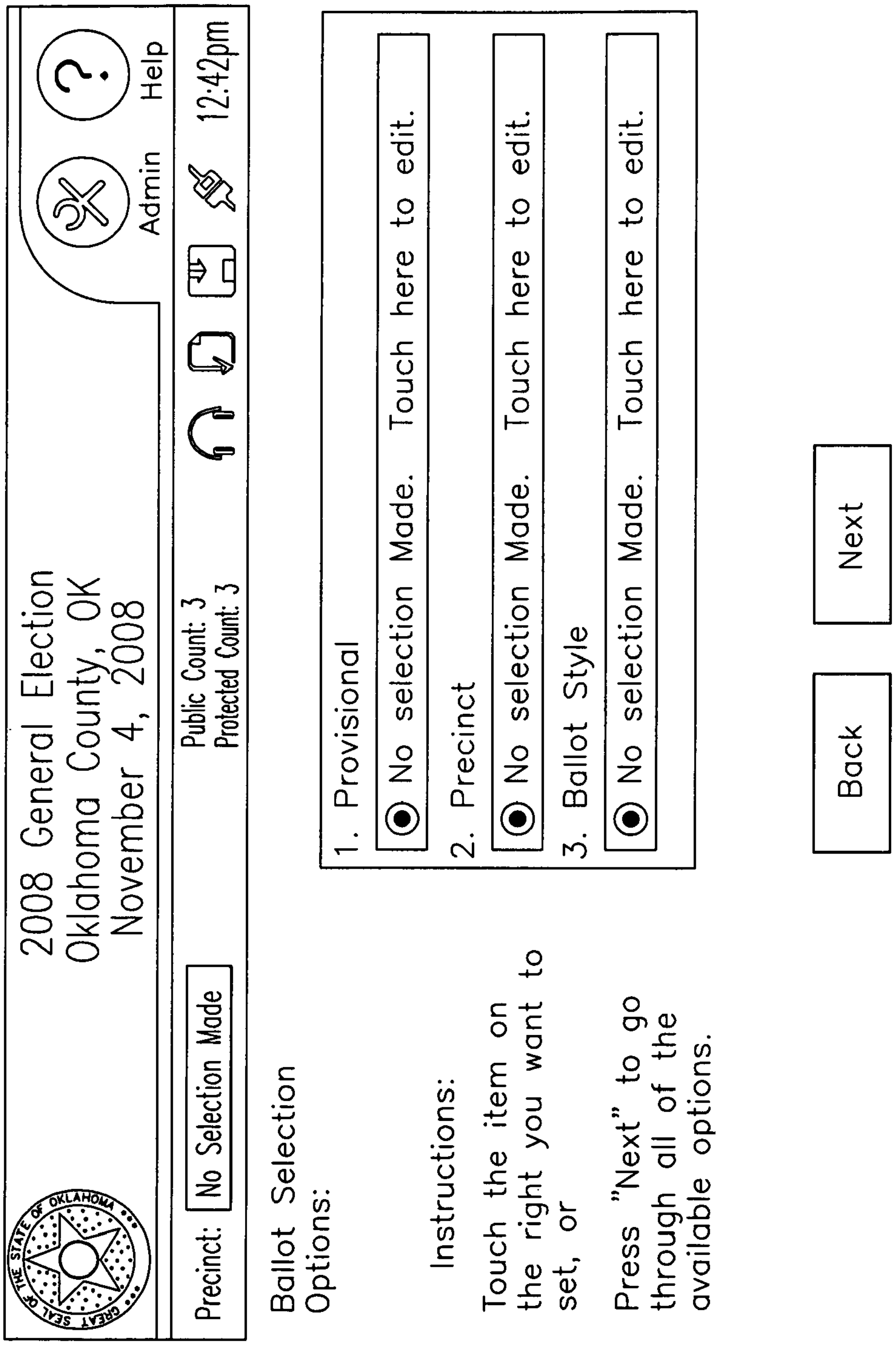
FIGS. 6A-6E are various screen shots of the display of the ballot tabulation device of FIG. 1, which are used in connection with the entry of a precinct identification code, a ballot style number and/or a provisional ballot number.

As shown in FIG. 6A, display 18 of ballot tabulation device 10 first displays an "Options" screen. Three screen areas are provided for a "Provisional" ballot, a "Precinct" setting, and a "Ballot Style" setting, as well as instructions to the polling official (e.g., "Touch the item on the right you want to set, or Press "Next" to go through all of the available options."). It can also be seen that the "Options" screen includes two selection buttons—"Back" and "Next."

Figure 6B:
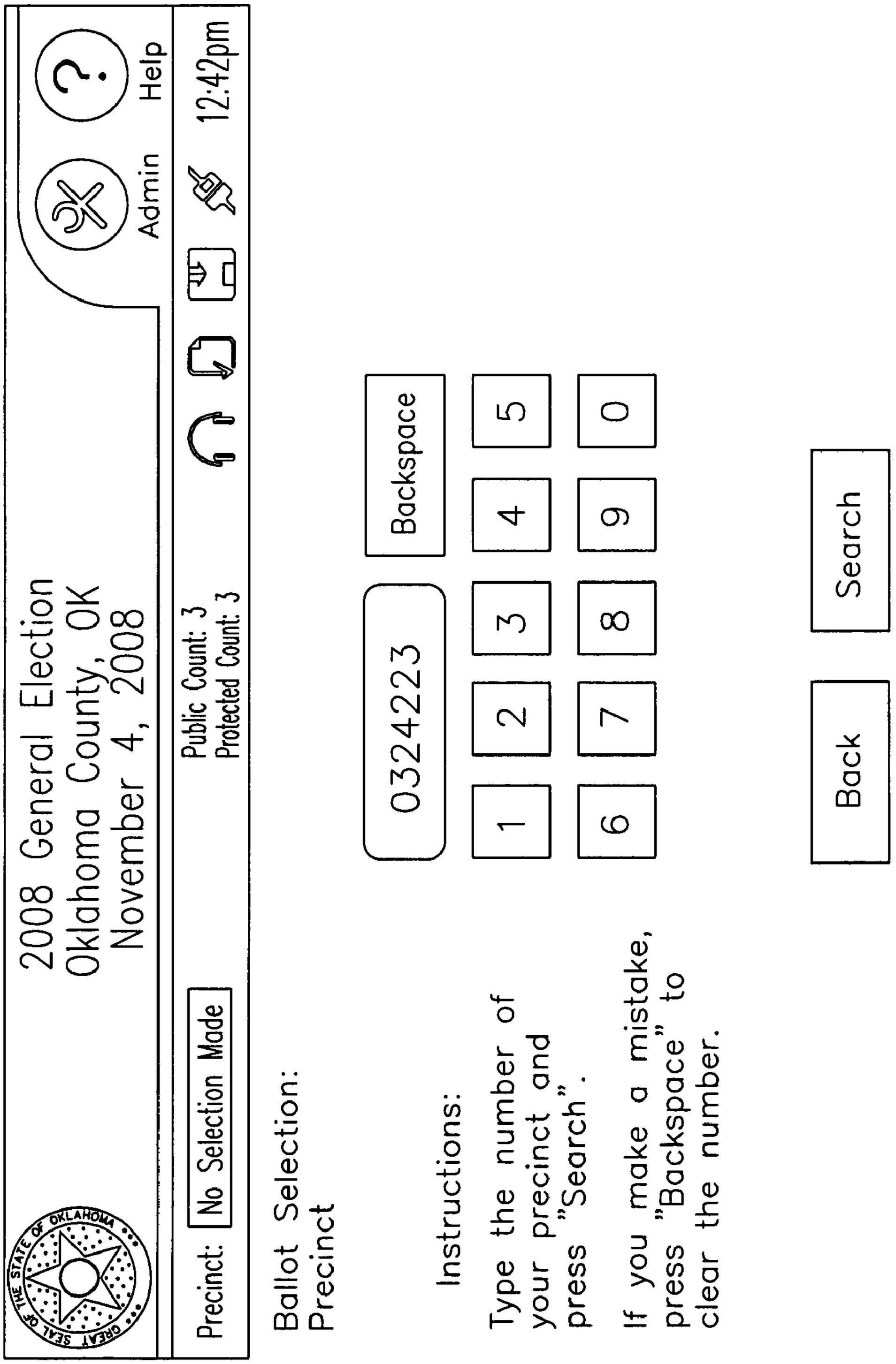

If the "Precinct" radio button is selected, the display 18 of ballot tabulation device 10 displays a "Precinct" screen, as shown in FIG. 6B. The "Precinct" screen includes a soft numeric keypad for entering a numerical precinct identification code, and instructions for making the selection (e.g., "Type the number of your precinct and press 'Search'. If you make a mistake, press 'Backspace' to clear the number."). Of course, it should be understood that the precinct identification code may comprise a string of alphanumeric characters, in which case a full keyboard may be displayed for entry of the number and/or letters of the precinct identification code. It can be seen that the "Precinct" screen also includes two selection buttons—"Back" and "Search."

Upon selection of the "Back" button, the display 18 of ballot tabulation device 10 displays the "Options" screen of FIG. 6A. Upon selection of the "Search" button, the ballot tabulation device 10 searches through a list of stored precinct identification codes to locate the voting precinct that corresponds to the entered precinct identification code. As shown in the FIG. 6D, a checkmark appears next to the selected precinct name (e.g., "Central High School 324223"). If the polling official wishes to change the precinct selection, he can touch the checkmark next to the selected precinct name and go back to the "Precinct" screen of FIG. 6B to repeat the precinct selection process.

Figure 6C:
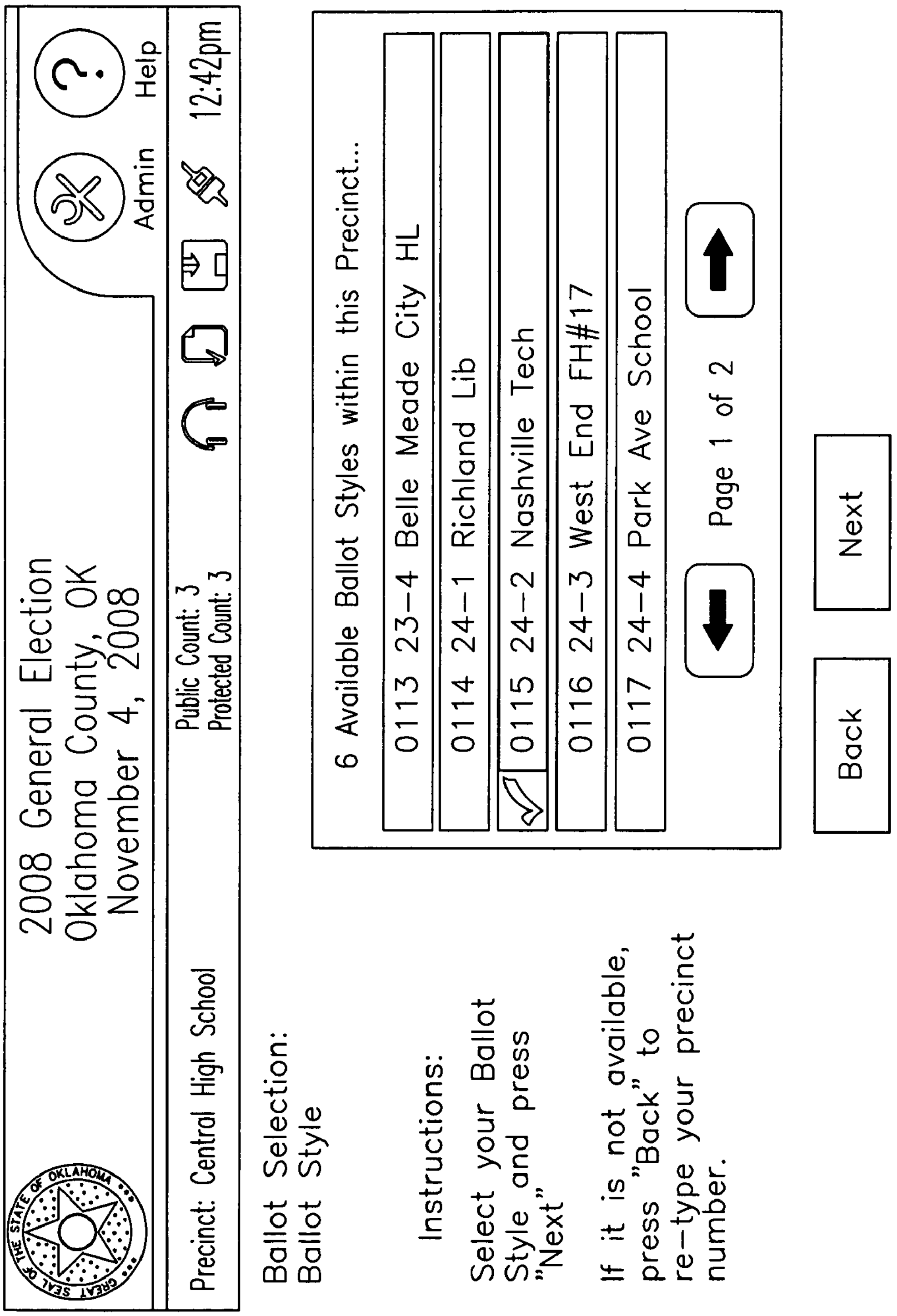

Referring back to the "Options" screen of FIG. 6A, upon selection of the "Ballot Style" radio button, the display 18 of ballot tabulation device 10 displays a "Ballot Style" screen, as shown in FIG. 6C. The "Ballot Style" screen is used to select the ballot style for the ballot, as written on the precinct identification slip (FIG. 5). The "Ballot Style" screen displays a list of available ballot styles for the selected voting precinct, which is a subset of all ballot styles loaded into the ballot tabulation device 10 as part of the election definition. The subset is defined by the precinct identification code selected in accordance with the precinct selection process described above. Of course, if no selections are made in regard to the precinct identification code, the list of available ballot styles will include all ballot styles loaded into the ballot tabulation device 10.

On the "Ballot Style" screen, if the list of available ballot styles exceeds the allocated screen area, the available ballot styles are divided into two or more pages wherein left-pointing and right-pointing buttons allow the polling official to scroll through the pages. The "Ballot Style" screen also includes instructions on how to effectuate the ballot style selection (e.g., "Select your Ballot Style and press 'Next'. If it is not available, press 'Back' to re-type your precinct number."). Upon selection of a ballot style, a checkmark appears next to the selected ballot style on the screen. Finally, it can be seen that the "Ballot Style" screen includes two selection buttons—"Back" and "Next." It should be appreciated that entry of a ballot style is optional and would not be required if the ballot style information is provided on the paper ballot itself (e.g., within the code channel marks 517 on ballot 510 shown in FIG. 4).

Figure 6D:
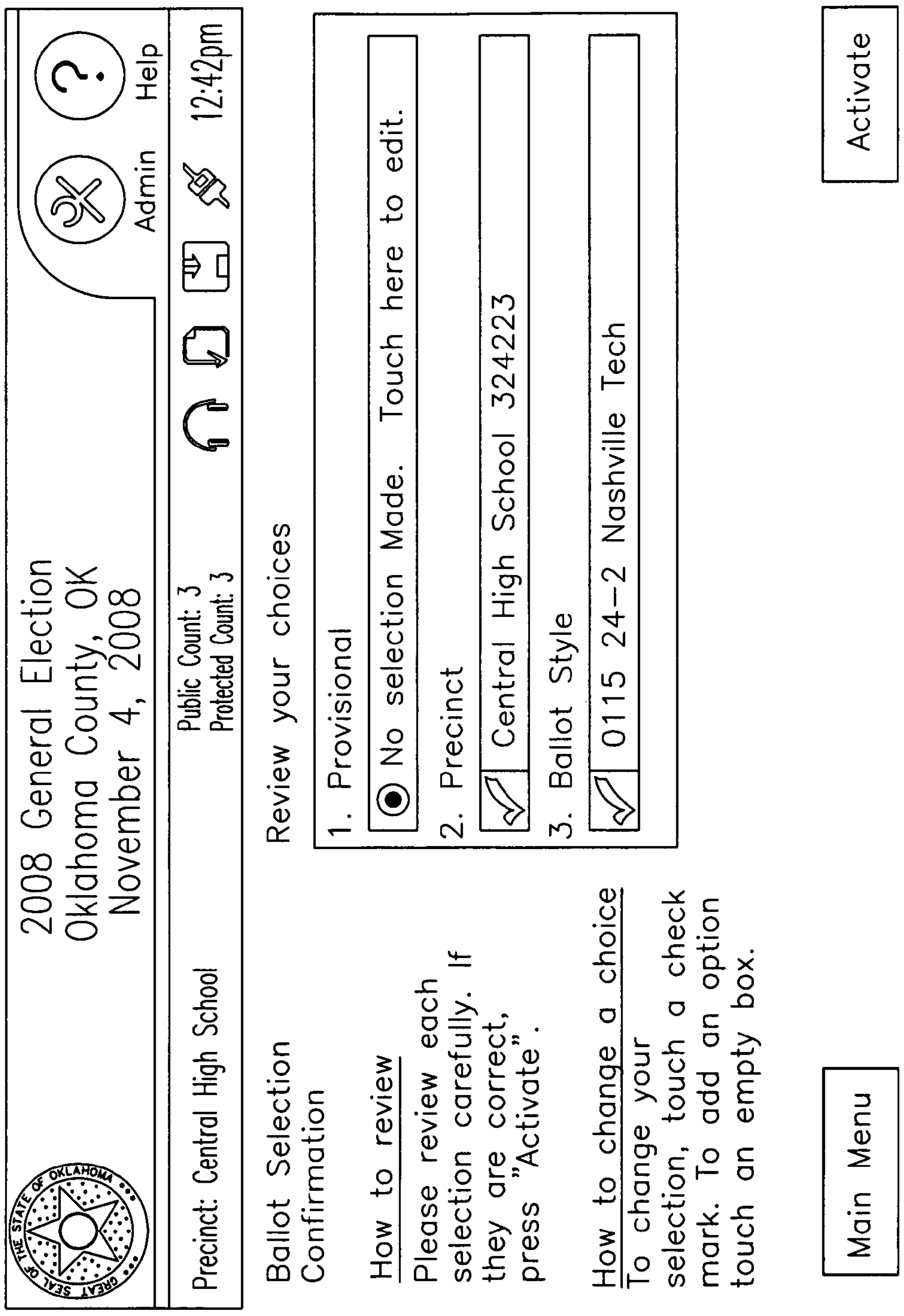

Upon selection of the "Next" button, the display 18 of the ballot tabulation device 10 displays a "Confirmation" screen, as shown in FIG. 6D. The "Confirmation" screen includes three screen areas displaying the polling official's selection of a "Provisional" ballot number (if applicable), a "Precinct" and a "Ballot Style." The "Confirmation" screen also includes instructions on review and activation of the selections (e.g., "Please review each selection carefully. If they are correct, press 'Activate.'"), and instructions on how to modify the entered selections (e.g., "To change your selection, touch a check mark. To add an option touch an empty box."). Finally, it can be seen that the "Confirmation" screen includes two selection buttons—"Main Menu" and "Activate." The "Main Menu" button leads the polling official to an administration screen, while the "Activate" button presents the voter with the "Welcome" screen shown in FIG. 7 (discussed below).

Figure 6E:
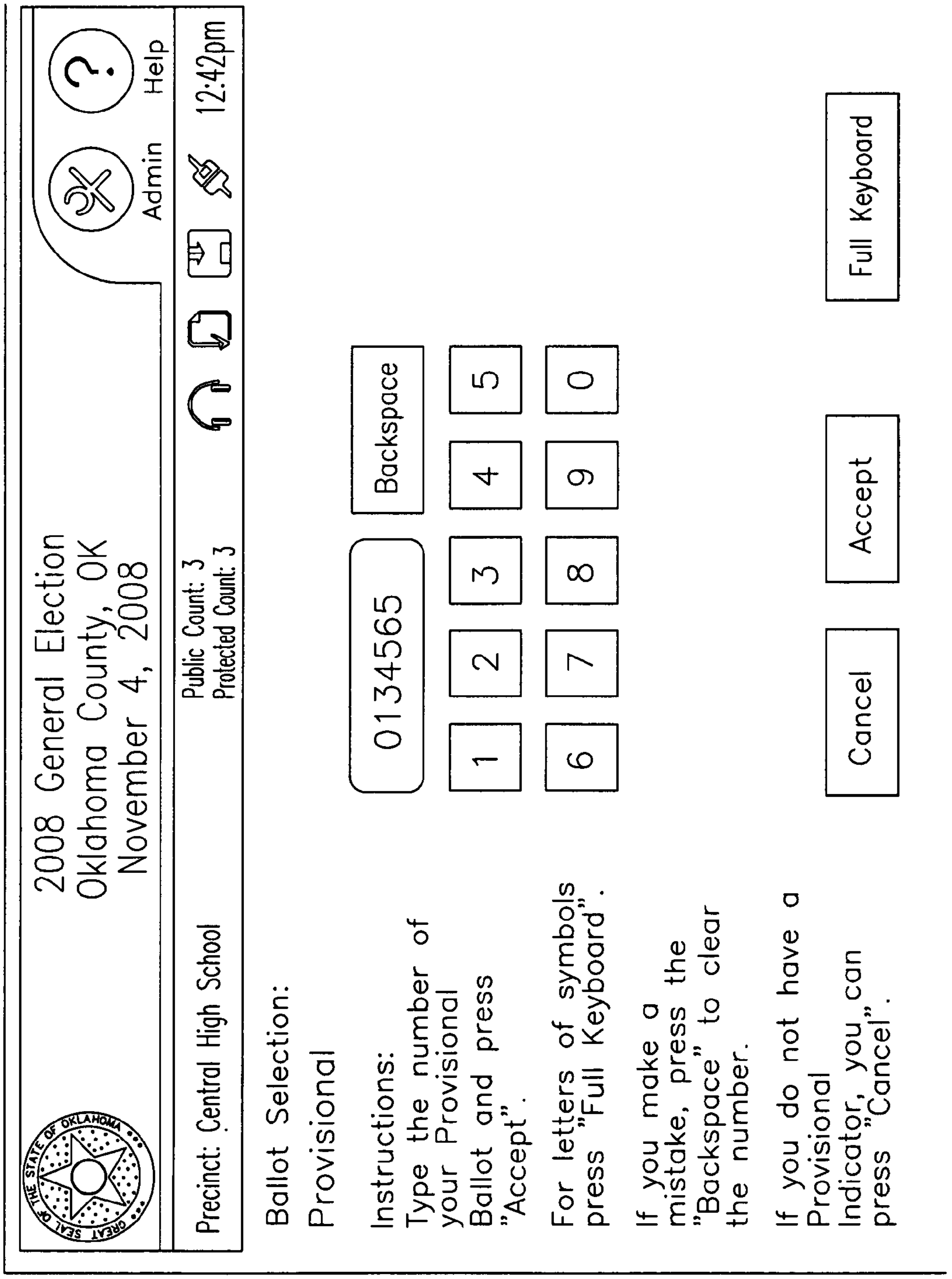

Referring back to the "Options" screen of FIG. 6A, upon selection of the "Provisional" radio button, the display 18 of ballot tabulation device 10 displays a "Provisional" screen, as shown in FIG. 6E. As is known in the art, a provisional ballot is a ballot used by a voter who is not registered to vote within a voting precinct (e.g., where the voter registration system has not been updated with the voter's identity). The "Provisional" screen displays a soft numeric keypad for entering provisional ballot number, and instructions for making the selection (e.g., "Type the number of your Provisional Ballot and press 'Accept.' For letters or symbols press 'Full Keyboard.' If you make a mistake, press the 'Backspace' to clear the number. If you do not have a Provisional indicator, you can press 'Cancel.'"). Finally, it can be seen that the "Provisional" screen includes two selection buttons—"Cancel" and "Accept." Upon selection of the "Accept" button, the ballot tabulation device 10 stores the provisional ballot in a separate memory location until such time as the election officials can determine the voter's right to vote. When this is determined, the provisional ballot may be added to the official vote count for the voting precinct or maintained separately for audit purposes. It can be appreciated that entry of a provisional ballot number is optional and would only apply to those voters who are required to submit a provisional ballot as just described.

Figure 7A:
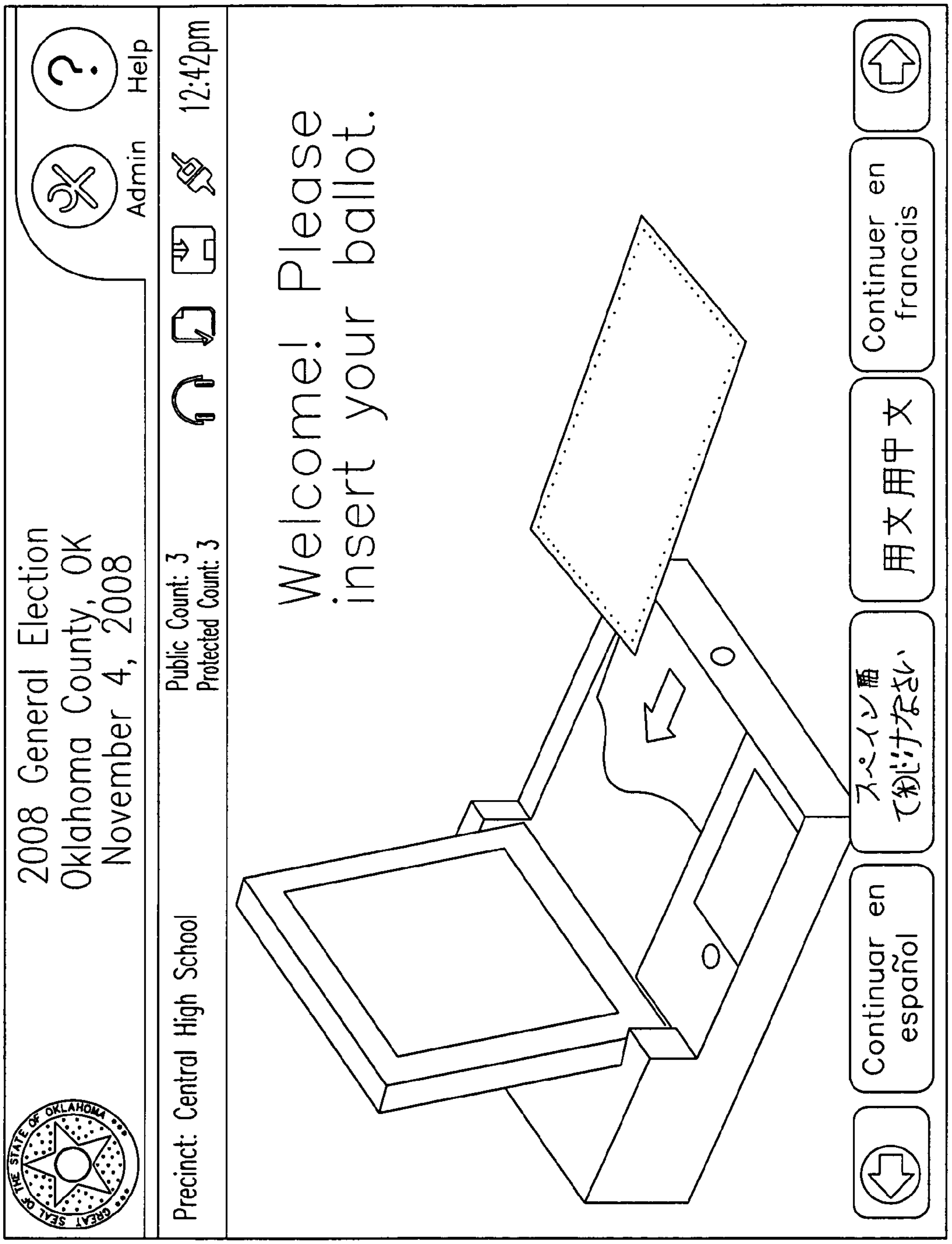
FIGS. 7A-7F are various screen shots of the display of the ballot tabulation device of FIG. 1, which are used in connection with the scanning and tabulation of a paper ballot.

Referring back to FIG. 3, after the polling official has entered and confirmed the precinct identification code (as well as the ballot style and/or provisional ballot number, if applicable), at step 112, the display 18 of ballot tabulation device 10 displays a "Welcome" screen, as shown in FIG. 7A. The "Welcome" screen displays a message (e.g., "Welcome. Please insert your ballot.") and a graphical depiction of the voting device demonstrating the proper insertion of the ballot into the ballot insertion tray (wherein the demonstration may be either static or moving). The "Welcome" screen also includes a horizontally scrollable list of available languages at the bottom of the screen. The list of languages can be customized to include the most frequently used languages for a particular precinct location. Furthermore, the "Welcome" screen may be set-up to offer the most frequently used languages on the display, wherein other languages are available by scrolling through the list using the scroll bar.

Figure 7B:
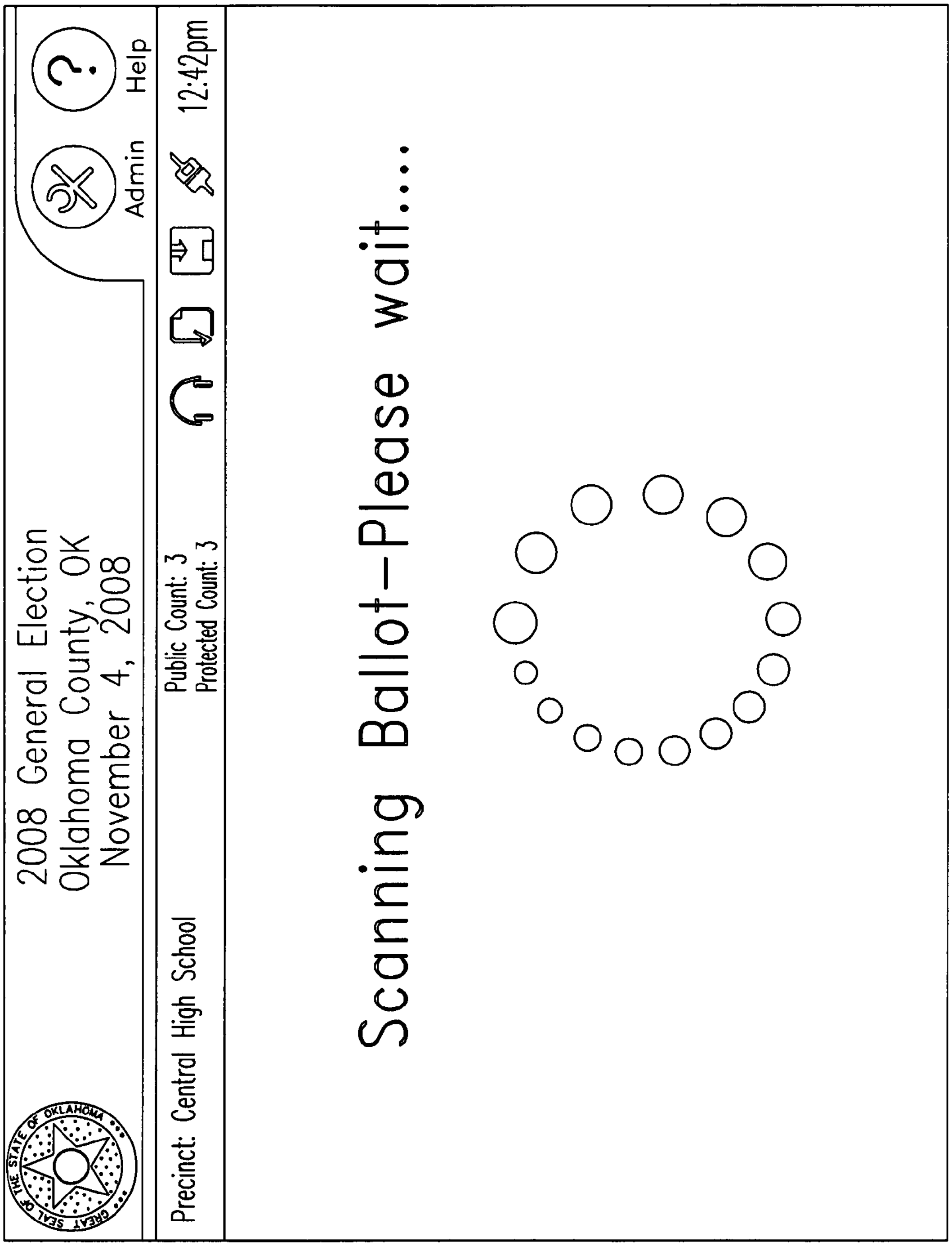

At block 114, the voter inserts her ballot into the ballot insertion tray 16 of the ballot tabulation device 10. The ballot position sensors continuously monitor whether a paper ballot has been inserted into the ballot insertion tray 16 and, upon detection of a ballot, the ballot is fed into the ballot scanner assembly 50. Upon receiving a paper ballot, the display 18 of ballot tabulation device 10 displays a "Scanning Ballot" screen, as shown in FIG. 7B, prompting the voter to wait until the voting selections marked on the ballot have been processed. The ballot scanner assembly 50 scans the paper ballot so as to capture an image of the ballot. For double-sided ballots, both sides of the paper ballot are preferably scanned simultaneously so as to capture an image of each side of the ballot. As discussed above, the removable USB flash drives of USB board 64 may be used to store the images of the scanned ballots, which may be accessed at a later time for audit purposes.

Next, the CPU board 52 analyzes the captured image of the ballot so as to decode the voting selections marked on the ballot. Preferably, the voting selections are decoded using intelligent mark recognition (IMR) technology as described in U.S. Pat. No. 6,854,644 assigned to the assignee of the present application, which is incorporated herein by reference in its entirety. The paper ballot may contain identification marks (e.g., code channel marks 517 on the ballot 510 shown in FIG. 4) that allow the CPU board 52 to select the proper ballot template (which is provided as part of the election definition loaded into the ballot tabulation device 10 via the removable USB flash drive or PEB at poll opening) for decoding the voting selections marked on the ballot. Alternatively, the ballot tabulation device 10 may utilize ballot style information entered by a polling official, as described above in connection with FIGS. 6A, 6C and 6D.

Figure 7C:
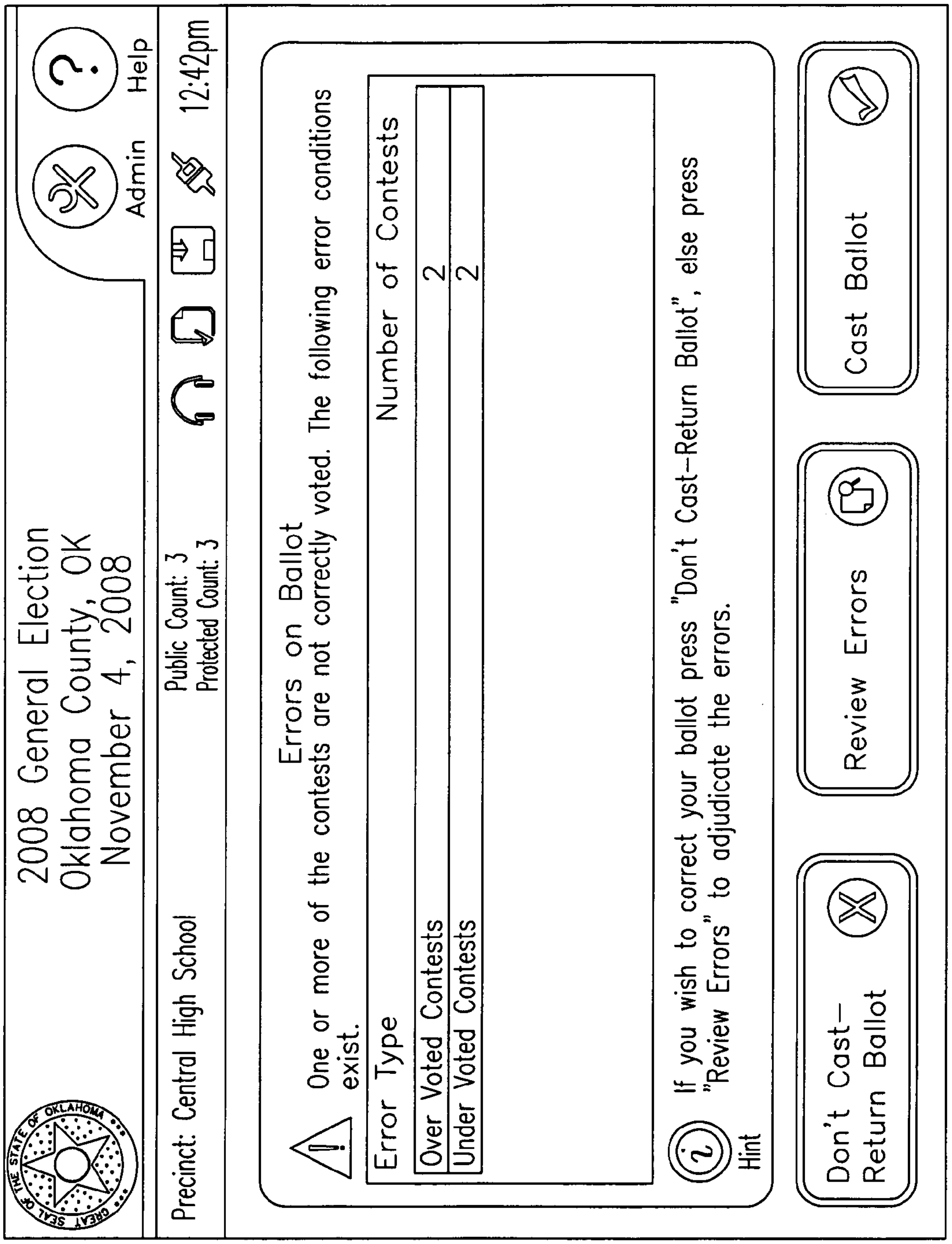

At block 116, the ballot tabulation device 10 identifies any irregularities associated with the paper ballot, including scanning errors (e.g., read errors or unclear marks) and errors relating to the decoding of the voting selections marked on the ballot (e.g., over votes and under votes). If one or more irregularities are detected, the display 18 of ballot tabulation device 10 displays an "Errors on Ballot" screen identifying the nature of the identified errors, as shown in FIG. 7C. The "Errors on Ballot" screen provides clear feedback to the voter on the disposition of his/her paper ballot. The "Errors on Ballot" screen displays a notification that one or more contests are not correctly voted (e.g., "One or more of the contests are not correctly voted. The following error conditions exist."), a list of encountered error types (e.g., "Over Voted Contests" and "Under Voted Contests"), and the number of contests affected with each listed error type. It can be seen that the "Errors on Ballot" screen also includes instructions on how to proceed (e.g., "If you wish to correct your ballot press 'Don't Cast—Return Ballot', else press 'Review Errors' to adjudicate the errors."). Finally, it can be seen that the "Errors on Ballot" screen includes three selection buttons—"Don't Cast—Return Ballot" (described below), "Review Errors," and "Cast Ballot" (described below).

Generally, by selecting one of the detected irregularities and then touching the "Review Errors" button, the voter is presented with a new screen listing the affected contests and describing the selected error type. Examples of the types of message screens that may be displayed on the display 18 of ballot tabulation device 10 will now be described with reference to FIGS. 7D and 7E.

Figure 7D:
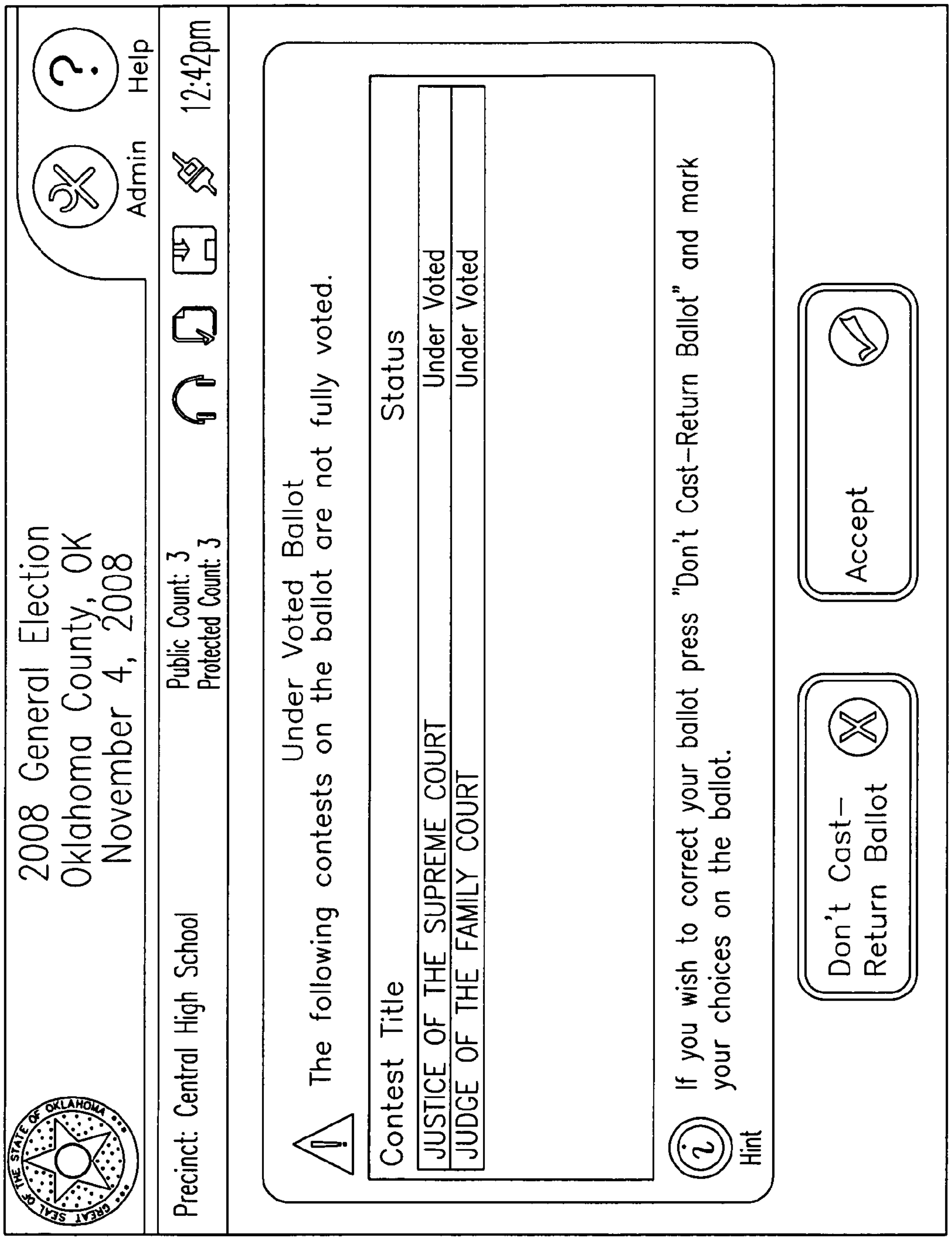

An exemplary "Under Voted Ballot" screen listing the under-voted contests is shown in FIG. 7D. The "Under Voted Ballot" screen includes identifying information for each of the under-voted contests (e.g., the "Contest Title") and instructions for correcting the under-voted contests on the ballot (e.g., "If you wish to correct your ballot press 'Don't Cast—Return Ballot' and mark your choices on the ballot."). Finally, it can be seen that the "Under Voted Ballot" screen includes two selection buttons—"Don't Cast Return Ballot" (described below) and "Accept" (described below).

Figure 7E:
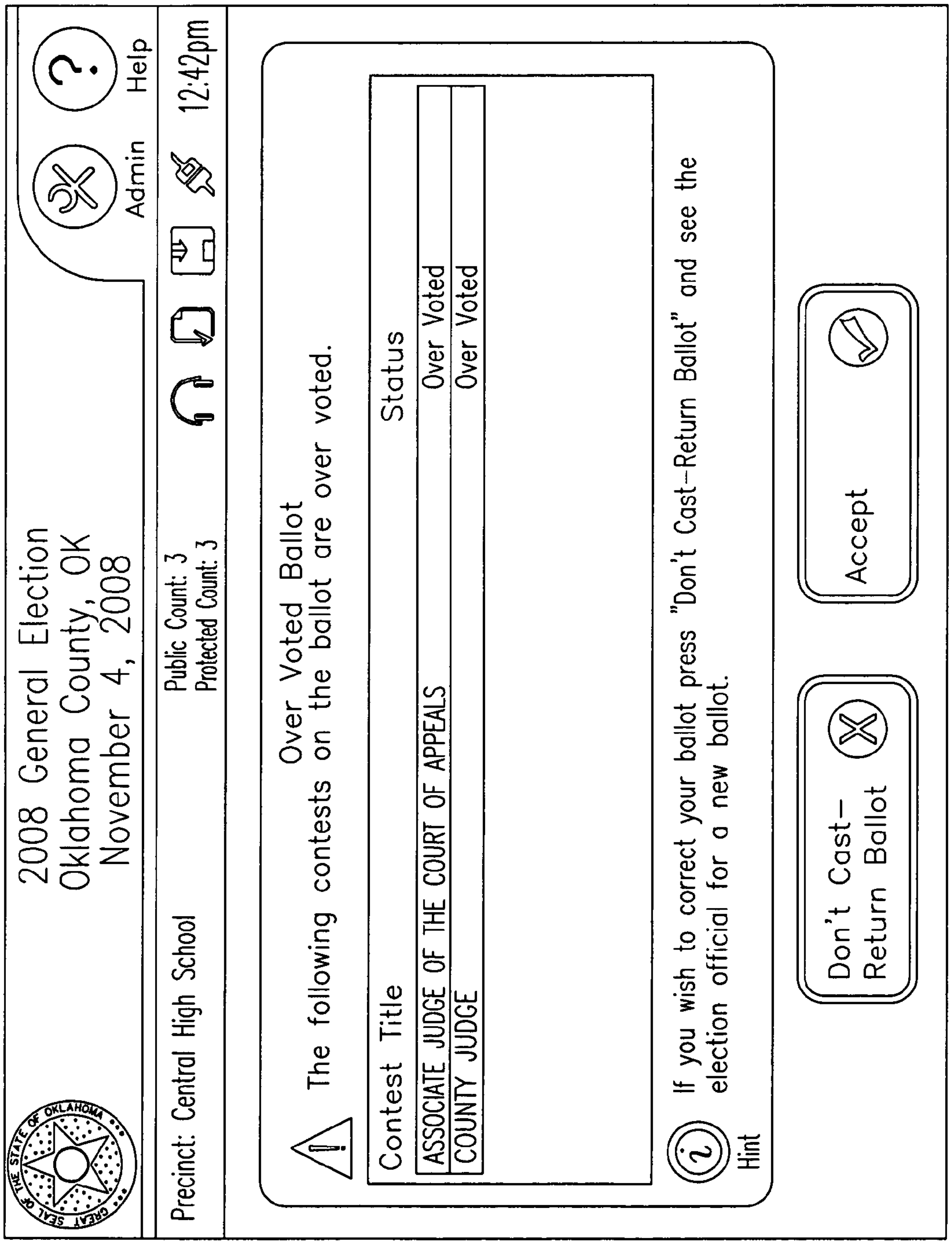

An exemplary "Over Voted Ballot" screen listing the over-voted contests is shown in FIG. 7E. The "Over Voted Ballot" screen includes identifying information for each of the over-voted contests (e.g., "Contest Title") and instructions for correcting the over-voted contests on the ballot (e.g., "If you wish to correct your ballot press 'Don't Cast—Return Ballot' and see the election official for a new ballot."). Finally, it can be seen that the "Over Voted Ballot" screen includes two selection buttons—"Don't Cast—Return Ballot" (described below) and "Accept" (described below). Of course, it should be understood that some jurisdictions prohibit casting over-voted ballots, in which case the "over-vote" screen would not allow casting the ballot, providing only one button—"OK"—for returning the ballot to the voter.

Referring back to FIG. 3, at block 118, a determination is made as to whether the paper ballot should be returned to the voter. It can be appreciated that this determination is made based upon whether the voter selects the "Don't Cast—Return Ballot" button or the "Cast Ballot/Accept" button on the screens depicted in FIGS. 7C to 7E, or, whether the error relates to the scanning of the ballot. If the voter selects the "Don't Cast—Return Ballot" button or if the error relates to the scanning of the ballot, the ballot is returned to the voter, preferably by feeding the ballot in the opposite direction through the ballot insertion tray 16. At this point, the voter may either correct the error on the same paper ballot or obtain a new ballot from a polling official (in which case the old incorrect ballot is marked as such and placed in a secure spoiled ballot envelope). If the voter selects the "Cast Ballot" button, the contests with irregularities (e.g., under-votes and/or over-votes) will not be included in the final tabulation while the remaining contests will be tabulated appropriately. It should be noted that the voting rules in some jurisdictions may prohibit casting ballots containing certain voting irregularities (e.g., over voted ballots). In those jurisdictions, if one or more prohibited irregularities are detected, the "Cast Ballot" button will not be displayed as an option.

Next, at block 120, the voting selections are tabulated by the CPU board 32 and stored in one of the removable USB flash drives of USB board 64 (noting, of course, that any contest with errors, such as under-votes and/or over-votes, are not tabulated). Preferably, the voting selections are stored in a table that includes the vote tally for the selected voting precinct., wherein the vote tally comprises a vote total for each of the voting options on the ballot. It should be understood that a separate vote tally will be stored for each of the voting precincts. Then, the public and protected counts (described below) are incremented by one to thereby provide confirmation that the ballot has been tabulated. The ballot is dropped into the secure ballot receptacle 26 where it is retained for audit purposes, as is known in the art.

Figure 7F:
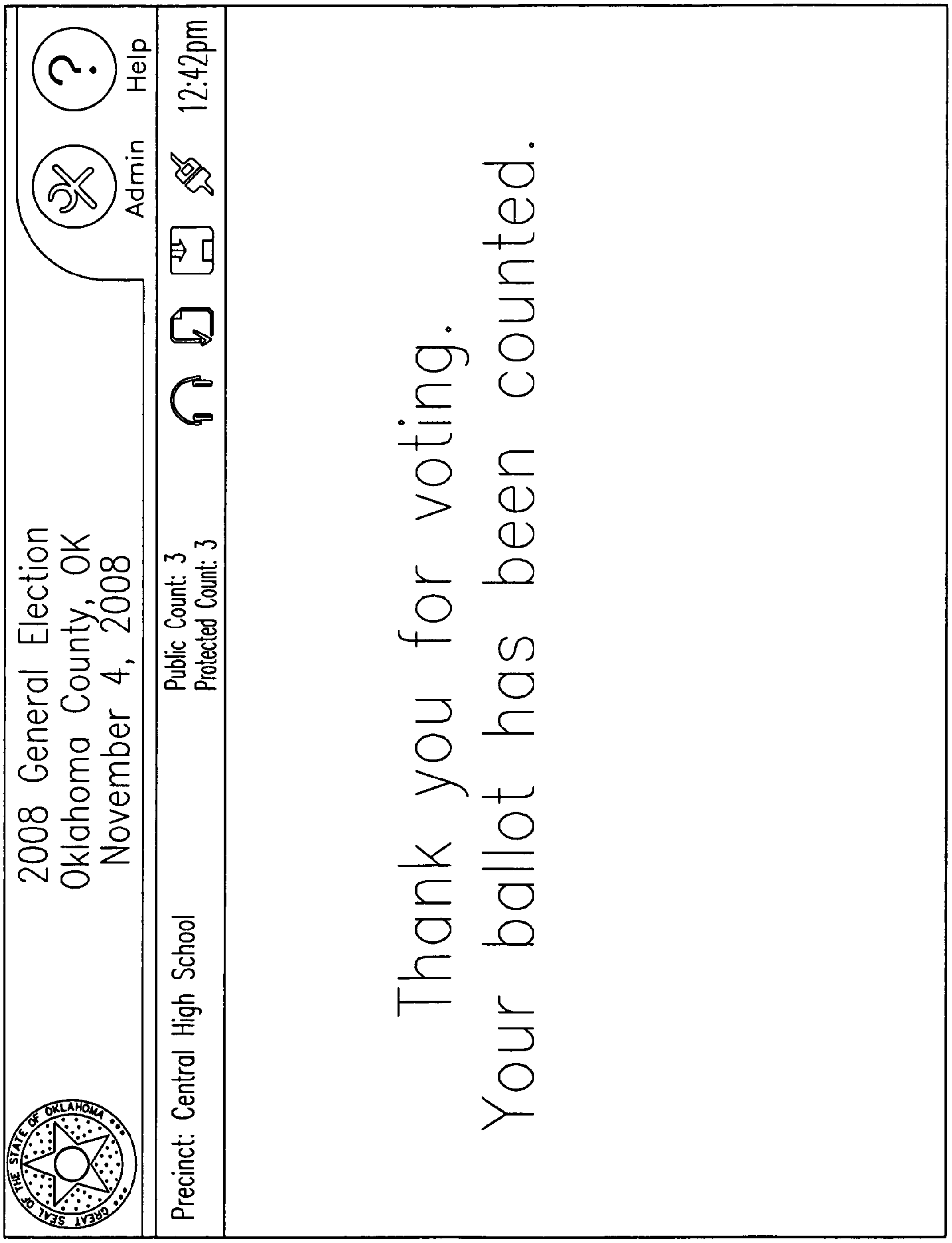

At block 122, the voting is completed and the display 18 of ballot tabulation device 10 displays a "Thank You For Voting" screen informing the voter that her voting selections have been tabulated. An example of such a screen is depicted in FIG. 7F. As can be seen, the "Thank You For Voting" screen displays a short message (e.g., "Thank you for voting. Your ballot has been counted.").

It should be noted that all of the screens described above (as shown in FIGS. 6A-6E and 7A-7F) display the same header information, including general information on the election (e.g., "2008 General Election; Oklahoma County, Okla.; Nov. 4, 2008"), a precinct identifier (e.g., "Precinct: Central High School", although this identifier does not appear until selection of the voting precinct), a protected count consisting of a total number of ballots cast on the ballot tabulation device over the entire life of the device (e.g., "Protected Count: 3"), and a public count consisting of a running total of the number of ballots cast on that ballot tabulation device during a particular election (e.g., "Public Count: 3").

Furthermore, all of the screens have an "Admin" button and a "Help" button located in the upper-right corner of the screen. Upon selection of the "Admin" button, an administration screen is displayed that provides functions necessary for the administration of the ballot tabulation device 10. Upon the selection of the "Help" button, a pop-up window is displayed which is designed to provide more detailed information regarding the particular operation of the ballot tabulation device 10. For example, a pop-up window that may be displayed during poll opening would list the steps required to open the poll for voting.

All of the screens also include four system indicator icons displayed directly below the "Admin" and "Help" buttons. These icons are non-selectable and are used primarily by polling officials and other non-voter users. The system indicator icons comprise, from left to right, an "accessible voting station status" headphones icon, an "election definition found" icon (which will include a small red "X" if the election definition is not found), an "additional ballot image storage found" icon (which will include a small red "X" if additional ballot image storage is not found), and a "running on AC power" icon. The "running on AC power" icon will be replaced with a "battery" icon when the ballot tabulation device 10 is running on battery power. This "battery" icon will preferably be displayed in live states representing the available capacity of the battery—100%, 75%, 50%, 25% and 0%. The "battery" icon may flash when the battery capacity drops below a predetermined level.

It should be understood that the screens shown in FIGS. 6A-6*e* and 7A-7F are merely examples of the type of message screens that may be used to implement the various features of the invention. One skilled in the art will appreciate that other message screens could alternatively be used that display the information in a different format and/or that display different types of information. Of course, other types of message screens (both for use by voters and polling officials) may be used in accordance with the invention.

Finally, at poll closing, the polling official depresses the "close polls" switch located on the main access board 66 of ballot tabulation device 10. In response, the accumulated vote totals for ballot tabulation device 10 are transmitted to a central vote accumulation site via a landline or wireless modem, such as the modem of main access board 66. Alternatively, the accumulated vote totals for ballot tabulation device 10 may be transported to the central vote accumulation site via a removable USB flash drive inserted into one of the USB ports of USB board 64.

It can be appreciated that the ballot tabulation device and method of the present invention may be used to save a jurisdiction a significant amount of taxpayer dollars by reducing the costs associated with the printing of paper ballots, the distribution of paper ballots to the voting precincts, and the programming and testing of the ballot tabulation devices. In addition, the invention also provides for what is commonly referred to as "Early Voting," "Walk-In Absentee Voting" or "Super Precincts," whereby any registered voter may vote at any of several polling sites within the jurisdiction. The jurisdiction would simply supply these polling sites with several based tabulation devices which are all programmed with the same election definition. The polling officials at the polling sites would simply select the voting precinct of the voter from the touch screen display of the ballot tabulation device to thereby allow the storage of tabulated votes in association with the correct voting precinct in the memory device of the device.

While the present invention has been described and illustrated hereinabove with reference to an exemplary embodiment, it should be understood that various modifications could be made to this embodiment without departing from the scope of the invention. For example, the ballot tabulation device could be implemented with a physical keypad (instead of touch screen display 18) for entry of the precinct identification code. Alternatively, the precinct identification code may be provided on a paper medium, such as a label attached to the paper ballot, and may further be encoded in a barcode printed on the paper medium. In this case, the ballot tabulation device would include a reader operable to read the precinct identification code (or the barcode) on the paper medium. Therefore, the present invention is not to be limited to the specific configuration or methodology of the exemplary embodiment, except insofar as such limitations are included in the following claims.

What is claimed and desired to be secured by Letters Patent is as follows:

1. A method of voting, comprising:

(a) providing a paper ballot to a voter, wherein the paper ballot does not include any precinct identification information;

(b) receiving the paper ballot from the voter with one or more voting selections marked thereon;

(c) displaying an entry screen that enables entry of a precinct identification code for the paper ballot;

(d) receiving the entered precinct identification code;

(e) scanning the paper ballot to determine the voting selections marked thereon;

(f) tabulating the voting selections marked on the paper ballot such that the tabulated voting selections are included within a vote tally associated with the entered precinct identification code; and (g) repeating steps (a)-(f) for each of a plurality of paper ballots.

2. The method of claim 1, wherein the precinct identification code is entered by a polling official.

3. The method of claim 1, wherein the precinct identification code is entered by a voter.

4. The method of claim 1, wherein the precinct identification code comprises a string of characters associated with a voting precinct.

5. The method of claim 1, wherein the entry screen comprises a soft keypad for entry of the precinct identification code.

6. The method of claim 1, wherein the paper ballot includes one or more contests and associated voting options, and wherein the vote tally associated with the precinct identification code comprises a vote total for each of the voting options.

7. The method of claim 1, further comprising storing the vote tally associated with the precinct identification code.

8. A ballot tabulation device programmed to tabulate paper ballots for a plurality of different voting precincts and maintain a separate vote tally for each of the voting precincts, the device comprising:

a user interface that includes functionality for a user to enter a precinct identification code for a paper ballot;

a scanner operable to scan the paper ballot; and a processing circuit operable to tabulate one or more voting selections marked on the paper ballot and include the tabulated voting selections within the vote tally associated with the precinct identification code.

9. The ballot tabulation device of claim 8, wherein the precinct identification code comprises a string of characters associated with a voting precinct.

10. The ballot tabulation device of claim 8, wherein the user interface comprises a touch screen display operable to display an entry screen that enables entry of the precinct identification code.

11. The ballot tabulation device of claim 10, wherein the entry screen comprises a soft keypad for entry of the precinct identification code.

12. The ballot tabulation device of claim 10, wherein the touch screen display is also operable to display information associated with the scanned paper ballot.

13. The ballot tabulation device of claim 12, wherein the displayed information comprises an indication of an irregularity associated with the scanned paper ballot.

14. The ballot tabulation device of claim 13, wherein the irregularity is selected from the following group: an undervote, an overvote, and combinations thereof.

15. The ballot tabulation device of claim 8, wherein the user interface comprises a physical keypad for entry of the precinct identification code.

16. The ballot tabulation device of claim 8, wherein the paper ballot does not include any precinct identification information.

17. The ballot tabulation device of claim 8, wherein the paper ballot includes one or more contests and associated voting options, and wherein the vote tally associated with the precinct identification code comprises a vote total for each of the voting options.

18. The ballot tabulation device of claim 8, further comprising a memory device operable to store the vote tally associated with the precinct identification code.

19. A method of tabulating paper ballots for a plurality of different voting precincts and maintaining a separate vote tally for each of the voting precincts, the method comprising:

(a) enabling entry of a precinct identification code for a paper ballot, wherein the paper ballot does not include any precinct identification information;

(b) scanning the paper ballot to determine one or more voting selections marked thereon;

(c) tabulating the voting selections marked on the paper ballot such that the tabulated voting selections are included within a vote tally associated with the precinct identification code; and (d) repeating steps (a)-(c) for each of a plurality of paper ballots.

20. The method of claim 19, wherein the precinct identification code is entered by a polling official.

21. The method of claim 19, wherein the precinct identification code is entered by a voter.

22. The method of claim 19, wherein the precinct identification code comprises a string of characters associated with a voting precinct.

23. The method of claim 19, wherein the enabling step comprises displaying an entry screen that enables entry of the precinct identification code.

24. The method of claim 23, wherein the entry screen comprises a soft keypad for entry of the precinct identification code.

25. The method of claim 19, wherein the enabling step comprises providing a physical keypad for entry of the precinct identification code.

26. The method of claim 19, further comprising displaying information associated with the scanned paper ballot.

27. The method of claim 26, wherein the displayed information comprises an indication of an irregularity associated with the scanned paper ballot.

28. The method of claim 27, wherein the irregularity is selected from the following group: an undervote, an overvote, and combinations thereof.

29. The method of claim 19, wherein the paper ballot does not include any precinct identification information.

30. The method of claim 19, wherein the paper ballot includes one or more contests and associated voting options, and wherein the vote tally associated with the precinct identification code comprises a vote total for each of the voting options.

31. The method of claim 19, further comprising storing the vote tally associated with the precinct identification code.

32. A method of conducting an election, comprising:

printing a plurality of paper ballots for each of a plurality of ballot styles, wherein the paper ballots do not include any precinct identification information;

providing the paper ballots to a plurality of voters from a plurality of different voting precincts;

receiving the paper ballots from the voters with one or more voting selections marked thereon; and inserting each of the paper ballots into a ballot tabulation device whereupon the device receives a precinct identification code for the paper ballot, scans the paper ballot to decode the voting selections marked thereon, and tabulates the decoded voting selections such that the tabulated voting selections are included within a vote tally associated with the precinct identification code.

33. The method of claim 32, wherein the precinct identification code is entered into the ballot tabulation device by a polling official.

34. The method of claim 32, wherein the precinct identification code is entered into the ballot tabulation device by a voter.

35. The method of claim 32, wherein the precinct identification code is provided on a paper medium separate from the paper ballot, and wherein the ballot tabulation device receives the precinct identification code by reading the precinct identification code on the paper medium.

36. The method of claim 35, wherein the precinct identification code is encoded in a barcode printed on the paper medium.

37. The method of claim 35, wherein the paper medium comprises a label attached to the paper ballot.

38. The method of claim 32, wherein the precinct identification code comprises a string of characters associated with a voting precinct.

39. The method of claim 32, wherein the ballot tabulation device comprises a touch screen display for displaying an entry screen that enables entry of the precinct identification code.

40. The method of claim 39, wherein the entry screen comprises a soft keypad for entry of the precinct identification code.

41. The method of claim 32, wherein the ballot tabulation device comprises a physical keypad that enables entry of the precinct identification code.

42. The method of claim 32, wherein the paper ballot includes one or more contests and associated voting options, and wherein the vote tally associated with the precinct identification code comprises a vote total for each of the voting options.

43. The method of claim 32, further comprising storing the vote tally associated with the precinct identification code.

44. A ballot tabulation device that may be utilized by a plurality of different voting precincts, the device comprising:

a memory device operable to store an election definition for a plurality of ballot styles;

an input device operable to receive a precinct identification code for a paper ballot, wherein the paper ballot does not include any precinct identification information;

a scanner operable to scan the paper ballot; and a processing circuit operable to utilize the election definition to decode one or more voting selections marked on the paper ballot, wherein the processing circuit is further operable to tabulate the decoded voting selections and include the tabulated voting selections within the vote tally associated with the precinct identification code.

45. The ballot tabulation device of claim 44, wherein the precinct identification code comprises a string of characters associated with a voting precinct.

46. The ballot tabulation device of claim 44, wherein the input device comprises a touch screen display operable to display an entry screen that enables entry of the precinct identification code.

47. The ballot tabulation device of claim 46, wherein the entry screen comprises a soft keypad for entry of the precinct identification code.

48. The ballot tabulation device of claim 46, wherein the touch screen display is also operable to display information associated with the scanned paper ballot.

49. The ballot tabulation device of claim 48, wherein the displayed information comprises an indication of an irregularity associated with the scanned paper ballot.

50. The ballot tabulation device of claim 49, wherein the irregularity is selected from the following group: an undervote, an overvote, and combinations thereof.

51. The ballot tabulation device of claim 44, wherein the input device comprises a physical keypad for entry of the precinct identification code.

52. The ballot tabulation device of claim 44, wherein the precinct identification code is provided on a paper medium separate from the paper ballot, and wherein the input device comprises a reader operable to read the precinct identification code on the paper medium.

53. The ballot tabulation device of claim 52, wherein the precinct identification code is encoded in a barcode printed on the paper medium.

54. The ballot tabulation device of claim 52, wherein the paper medium comprises a label attached to the paper ballot.

55. The ballot tabulation device of claim 44, wherein the paper ballot does not include any precinct identification information.

56. The ballot tabulation device of claim 44, wherein the paper ballot includes one or more contests and associated voting options, and wherein the vote tally associated with the precinct identification code comprises a vote total for each of the voting options.

57. The ballot tabulation device of claim 44, wherein the memory device is also operable to store the vote tally associated with the precinct identification code.

* * * * *